(12) United States Patent
Hansen et al.

(10) Patent No.: US 7,959,435 B2
(45) Date of Patent: Jun. 14, 2011

(54) METHOD AND APPARATUS FOR REDUCING $NO_x$ EMISSIONS IN ROTARY KILNS BY SNCR

(75) Inventors: Eric R. Hansen, Shawnee, KS (US); Kenneth J. Derksen, South Bend, IN (US); Kevin Blankenship, Dallas, TX (US); Walter Parker, Alvarado, TX (US); Ralph A. Supelak, Strongsville, OH (US); James R. Tutt, Texarkana, TX (US)

(73) Assignees: Cadence Environmental Energy, Inc., Michigan City, IN (US); Ash Grove Cement Company, Overland Park, KS (US)

( * ) Notice: Subject to any disclaimer, the term of this patent is extended or adjusted under 35 U.S.C. 154(b) by 983 days.

(21) Appl. No.: 11/621,336

(22) Filed: Jan. 9, 2007

(65) Prior Publication Data
US 2008/0070177 A1 Mar. 20, 2008

Related U.S. Application Data

(60) Provisional application No. 60/866,046, filed on Nov. 15, 2006, provisional application No. 60/806,038, filed on Jun. 28, 2006, provisional application No. 60/796,113, filed on Apr. 28, 2006, provisional application No. 60/757,376, filed on Jan. 9, 2006.

(51) Int. Cl.
*F27B 15/10* (2006.01)
(52) U.S. Cl. ............ 432/108; 432/14; 432/72; 110/345
(58) Field of Classification Search .................. 432/14, 432/58, 72, 108; 110/345
See application file for complete search history.

(56) References Cited

U.S. PATENT DOCUMENTS

| | | | |
|---|---|---|---|
| 3,488,700 A | 1/1970 | Iken et al. | |
| 3,584,850 A | 6/1971 | Brandvold et al. | |
| 3,900,554 A * | 8/1975 | Lyon | 423/235 |
| 4,208,386 A * | 6/1980 | Arand et al. | 423/235 |
| 4,255,115 A | 3/1981 | Graat et al. | |
| 4,329,180 A | 5/1982 | Herchenbach et al. | |
| 4,850,290 A | 7/1989 | Benoit et al. | |
| 4,930,965 A | 6/1990 | Peterson et al. | |
| 4,974,529 A | 12/1990 | Benoit et al. | |
| 4,984,983 A | 1/1991 | Enkegaard | |
| 5,078,594 A | 1/1992 | Tutt et al. | |
| 5,083,516 A | 1/1992 | Benoit et al. | |
| 5,086,716 A | 2/1992 | Lafser, Jr. | |

(Continued)

FOREIGN PATENT DOCUMENTS
DE 19641207 3/1997
(Continued)

OTHER PUBLICATIONS

Engineering drawings for air injection system for kiln installed in Obourg, Belgium, Jun. 1997, three sheets.

(Continued)

*Primary Examiner* — Gregory A Wilson
*Assistant Examiner* — Seth Greenia
(74) *Attorney, Agent, or Firm* — Barnes & Thornburg LLP

(57) ABSTRACT

A method of operating a mineral processing kiln includes introducing a quantity of a selective non-catalytic reduction (SNCR) reducing agent into the kiln. The SNCR reducing agent may be a solid, liquid, or a gas. A mineral processing kiln modified for the implementation of SNCR is also disclosed.

12 Claims, 28 Drawing Sheets

U.S. PATENT DOCUMENTS

| | | | |
|---|---|---|---|
| 5,122,189 | A | 6/1992 | Garrett et al. |
| 5,224,433 | A | 7/1993 | Benoit et al. |
| 5,257,586 | A | 11/1993 | Davenport |
| 5,339,751 | A | 8/1994 | Tutt |
| 5,375,535 | A | 12/1994 | Tutt |
| 5,413,476 | A | 5/1995 | Baukal, Jr. et al. |
| 5,451,255 | A | 9/1995 | Hansen et al. |
| 5,454,715 | A | 10/1995 | Hansen et al. |
| 5,569,030 | A | 10/1996 | Hansen et al. |
| 5,632,616 | A | 5/1997 | Tutt et al. |
| 5,728,357 | A * | 3/1998 | von Harpe .......... 423/239.1 |
| 5,968,464 | A | 10/1999 | Peter-Hoblyn et al. |
| 5,989,017 | A | 11/1999 | Evans |
| 6,000,937 | A | 12/1999 | Schilling et al. |
| 6,050,813 | A | 4/2000 | Doumet |
| 6,210,154 | B1 | 4/2001 | Evans et al. |
| 6,213,764 | B1 | 4/2001 | Evans |
| 6,257,877 | B1 | 7/2001 | Hundebol |
| 6,474,984 | B2 | 11/2002 | Gardner |
| 6,672,865 | B2 * | 1/2004 | Hansen et al. .......... 432/14 |
| 7,223,372 | B2 * | 5/2007 | Wakasa et al. .......... 422/168 |
| 7,264,785 | B2 * | 9/2007 | Blakeman et al. ........ 423/213.2 |
| 2005/0106082 | A1 | 5/2005 | Wakasa et al. |
| 2008/0032247 | A1 * | 2/2008 | Nolan et al. .......... 432/14 |

FOREIGN PATENT DOCUMENTS

| | | |
|---|---|---|
| EP | 0803693 | 10/1997 |
| JP | 2000130744 | 5/2000 |
| WO | 9525075 | 9/1995 |
| WO | 9737754 | 10/1997 |

OTHER PUBLICATIONS

"NOx Reduction and Destruction," Craig Wahlquist, World Cement, Oct. 2000, pp. 1-3.

"A Model for Prediction of Selective Noncatalytic Reduction of Nitrogen Oxides by Ammonia, Urea, and Cyanuric Acid with Mixing Limitations in the Presence of CO," J. Brouwer et al., Twenty-Sixth Symposium (International) on Comubstion/The Combustion Institute, 1996, pp. 2117-2124.

"Enhancing SNCR Performance," International Cement Review, Dec. 2006, three pages.

"Assessment of NOx Emissions Reduction Strategies for Cement Kilns—Ellis County," Jul. 14, 2006, 180 pages.

International Search Report and Written Opinion, mailed Nov. 21, 2007, for PCT/US07/60264.

"Study of the Urea Thermal Decomposition (Pyrolysis) Reaction and Importance to Cyanuric Acid Production," Peter M. Schaber et al., American Laboratory, Aug. 1999, pp. 13-21.

"The Present State of NOx Abatement with the SNCR Process," Cement International, Feb. 2006, vol. 4, pp. 63-74.

Supplementary European Search Report, Application No. EP07710009.7-1215, dated Sep. 13, 2010.

Chinese Office Action, Application No. 200780008429.3, dated Nov. 9, 2010.

* cited by examiner

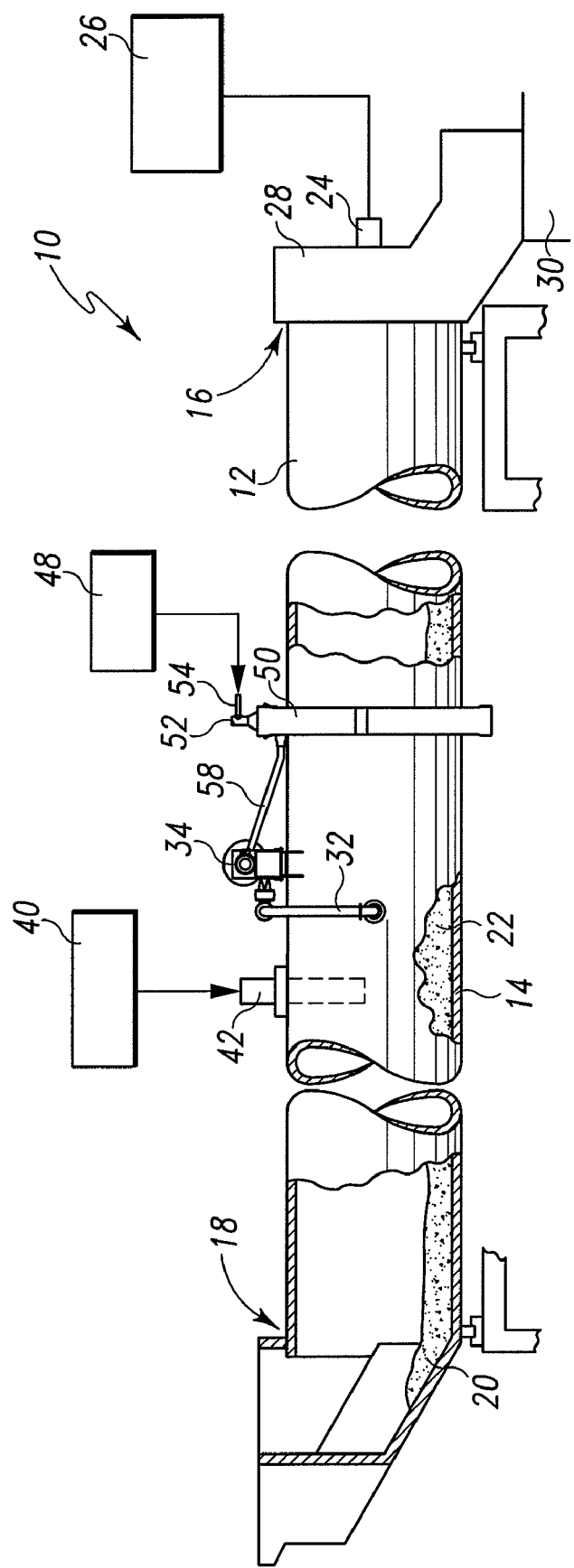

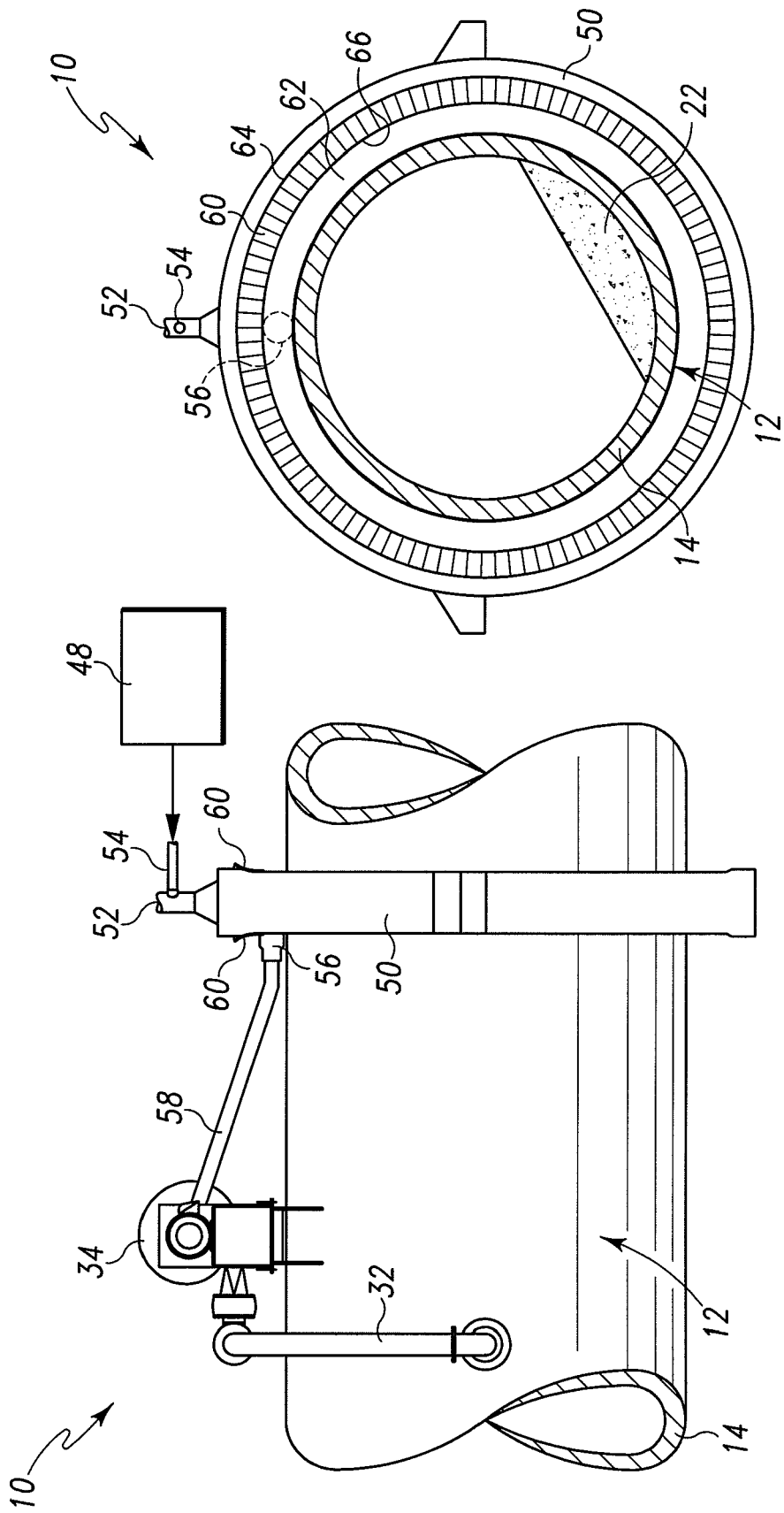

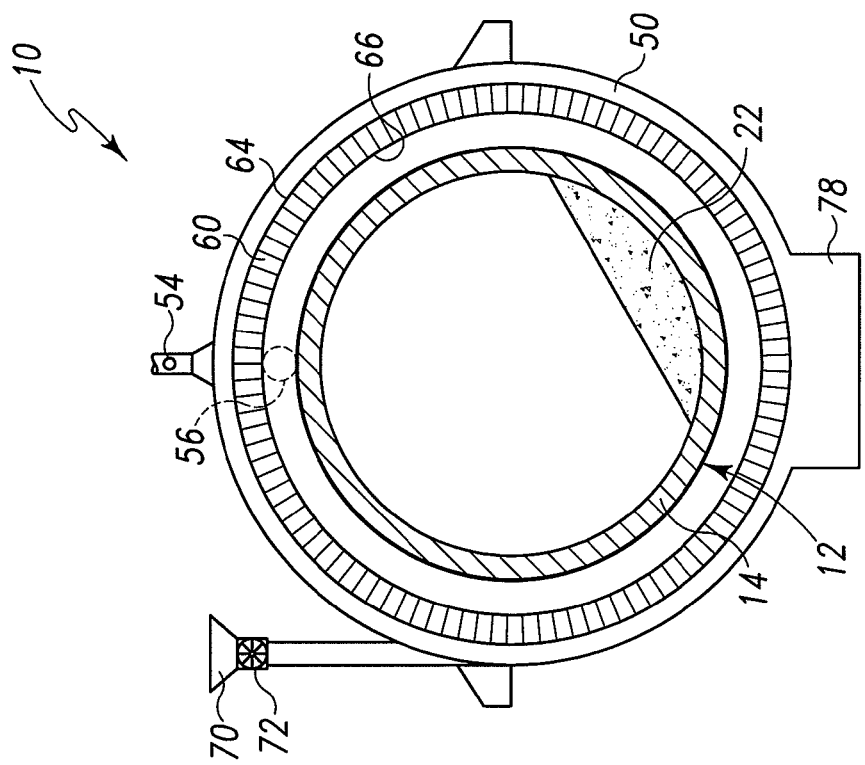
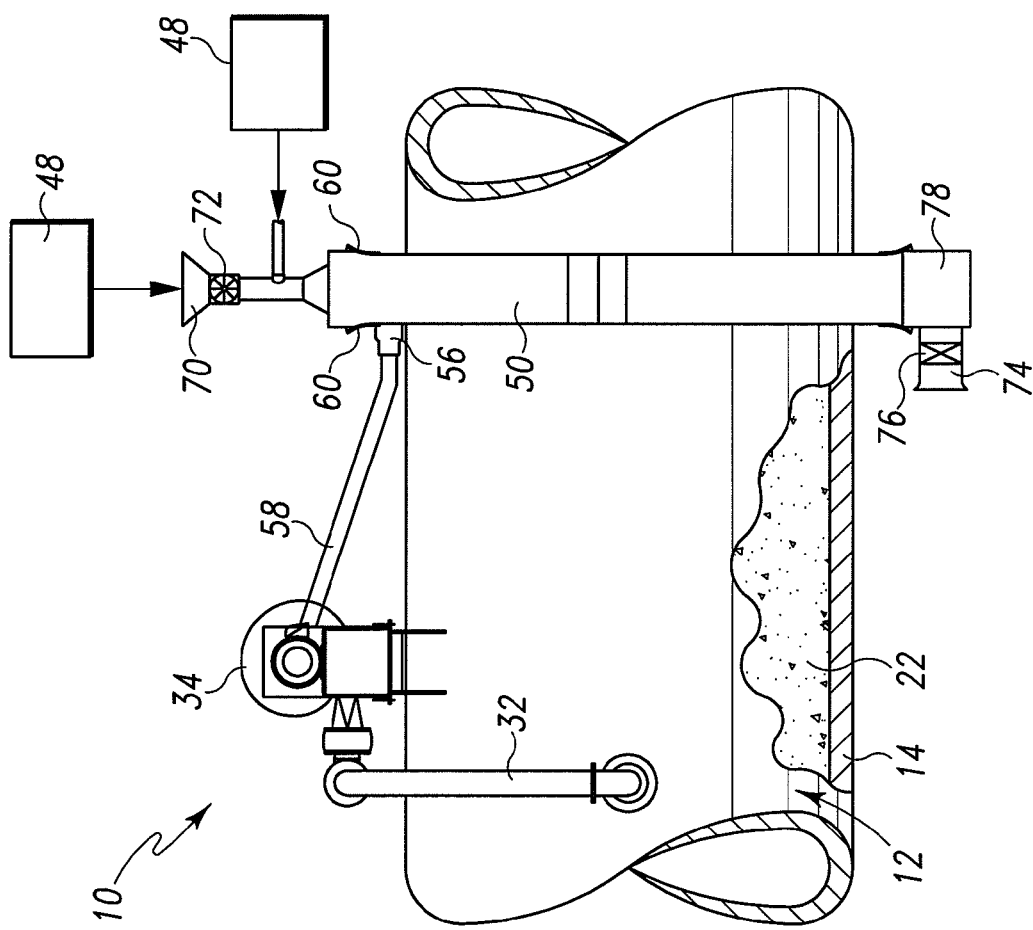
Fig. 8
Fig. 7

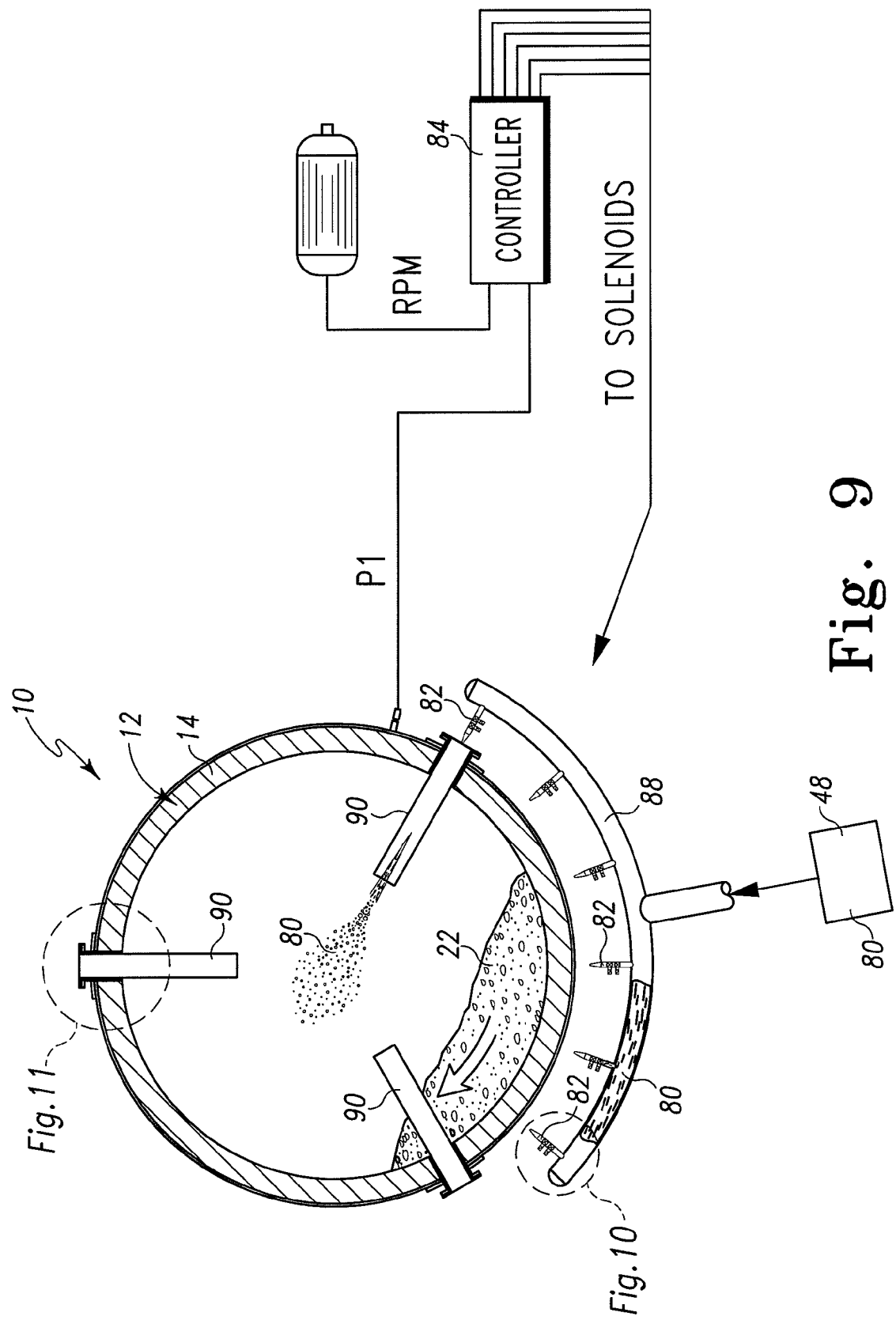

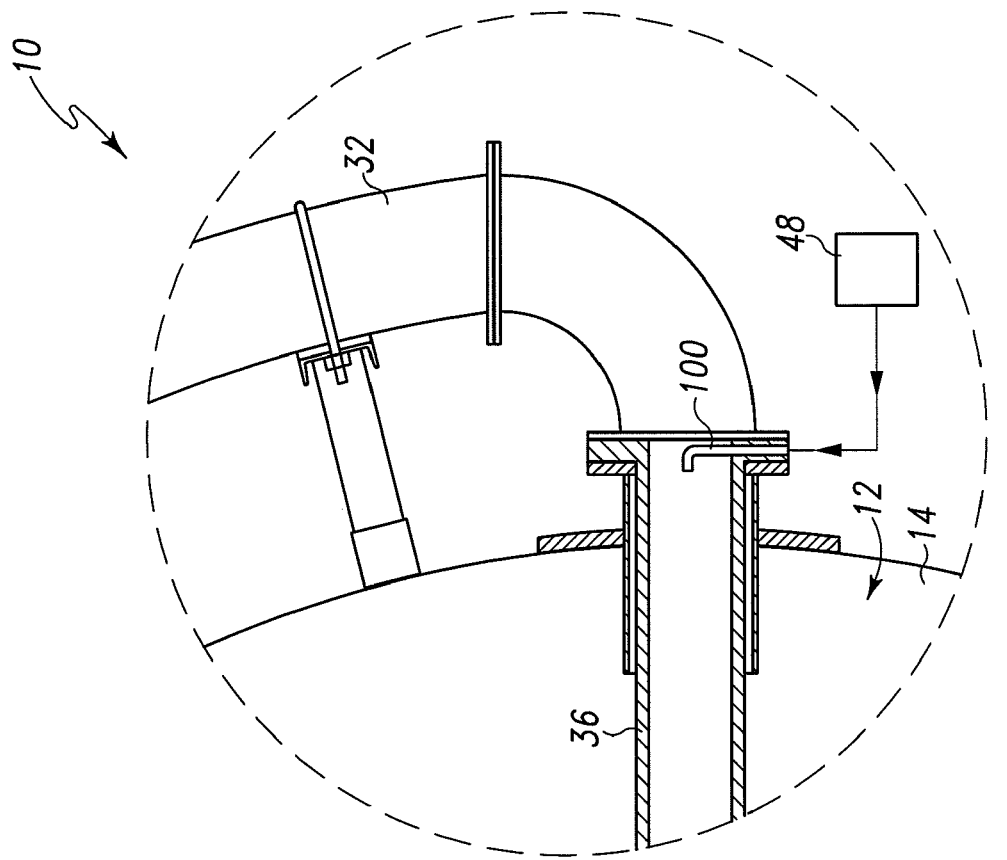
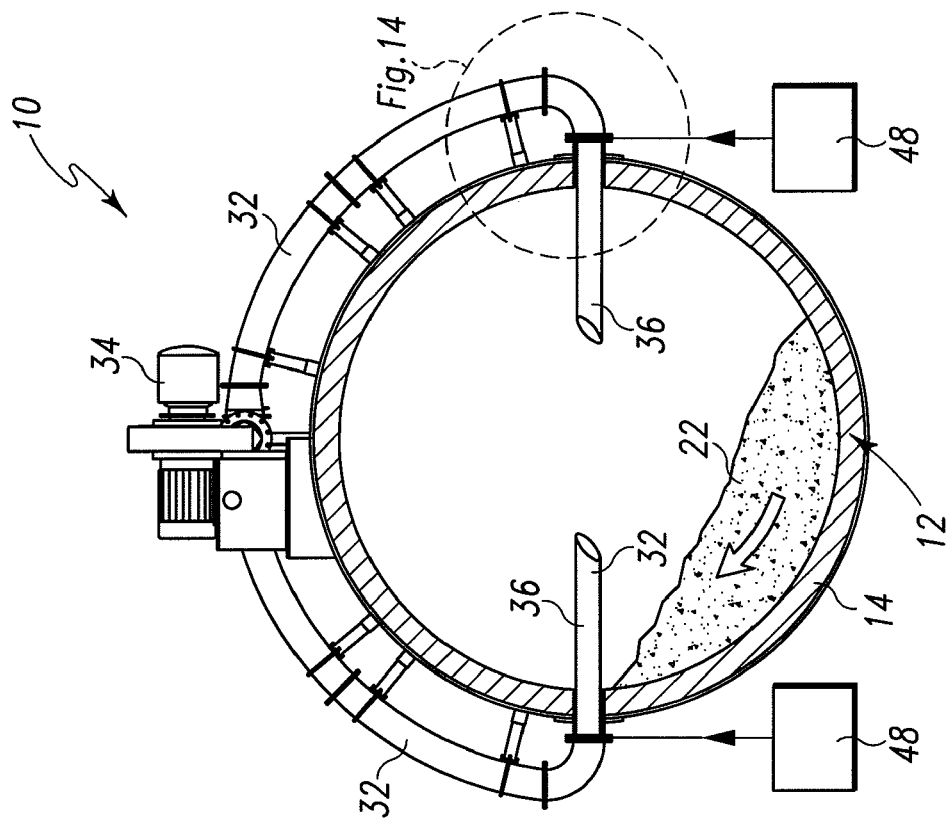
Fig. 14
Fig. 13

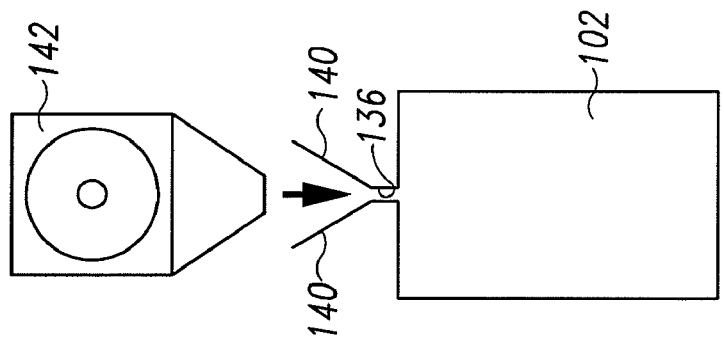
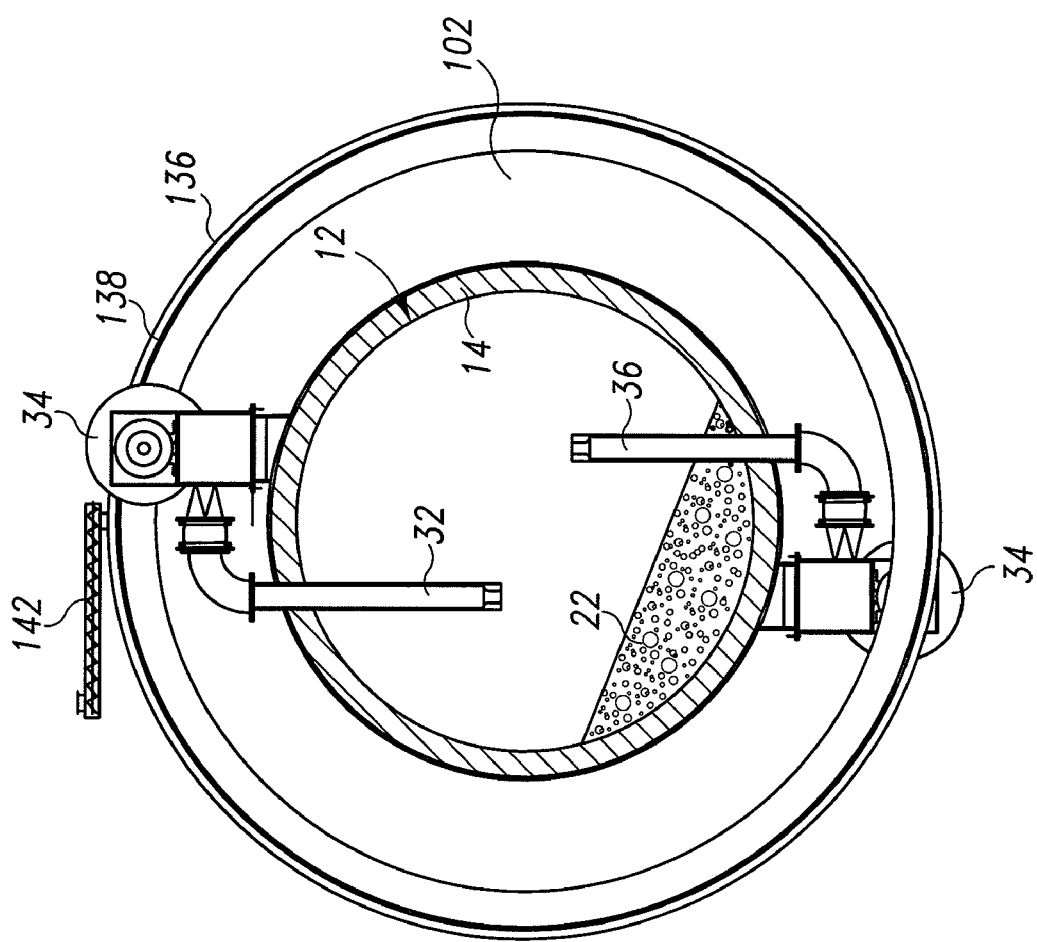
Fig. 31
Fig. 30

METHOD AND APPARATUS FOR REDUCING $NO_x$ EMISSIONS IN ROTARY KILNS BY SNCR

This application claims priority to U.S. Provisional Patent Application Ser. No. 60/757,376, filed Jan. 9, 2006 entitled METHOD AND APPARATUS FOR REDUCING $NO_X$ EMISSIONS IN LONG CEMENT ROTARY KILNS BY SNCR; U.S. Provisional Patent Application Ser. No. 60/796,113, filed Apr. 28, 2006 entitled METHOD AND APPARATUS FOR REDUCING $NO_X$ EMISSIONS IN ROTARY KILNS BY SNCR; U.S. Provisional Patent Application Ser. No. 60/806,038, filed Jun. 28, 2006 entitled METHOD AND APPARATUS FOR REDUCING $NO_X$ EMISSIONS IN ROTARY KILNS BY SNCR; and U.S. Provisional Patent Application Ser. No. 60/866,046, filed Nov. 15, 2006 entitled METHOD AND APPARATUS FOR REDUCING $NO_X$ EMISSIONS IN ROTARY KILNS BY SNCR. The entirety of each of these provisional applications is hereby incorporated by reference.

TECHNICAL FIELD

The present disclosure relates to mineral processing kilns, and in particular to those kilns in which the processed mineral liberates gas during thermal processing.

BACKGROUND

In the widely used commercial process for the manufacture of cement, the steps of drying, calcining, and clinkering cement raw materials are accomplished by passing finely divided raw materials, including calcareous minerals, silica and alumina, through a heated, inclined rotary vessel or kiln. In what is known as conventional long dry or wet process kilns the entire mineral heating process is conducted in a heated rotating kiln cylinder, commonly referred to as a "rotary vessel." The rotary vessel is typically 10 feet to greater than 25 feet in diameter and 150-700 feet in length (with typical length-to-diameter ratios being anywhere from 15:1 to 40:1) and is inclined so that as the vessel is rotated, raw materials fed into the upper end of the kiln cylinder move under the influence of gravity toward the lower "fired" end where the final clinkering process takes place and where the product cement clinker is discharged for cooling and subsequent processing. Kiln gas temperatures in the fired clinkering zone of the kiln range from about 1300° C. (~2400° F.) to about 2200° C. (~4000° F.). Kiln gas exit temperatures are as low as about 250° C. (~400° F.) to 350° C. (~650° F.) at the upper mineral receiving end of so-called wet process kilns. Up to 1100° C. (~2000° F.) kiln gas temperatures exist in the upper end of dry process rotary kilns.

Generally, skilled practitioners consider the cement making process within the rotary kiln to occur in several stages as the raw material flows from the cooler gas exit mineral feed end to the fired/clinker exit lower end of the rotary kiln vessel. As the mineral material moves down the length of the kiln it is subjected to increasing kiln gas temperatures. Thus in the upper portion of the kiln cylinder where the kiln gas temperatures are the lowest, the in-process mineral materials first undergo a drying/preheating process and thereafter move down the kiln cylinder until the temperature is raised to calcining temperature. The length of the kiln where the mineral is undergoing a calcining process (releasing carbon dioxide) is designated the calcining zone. The in-process mineral finally moves down the kiln into a zone where gas temperatures are the hottest, the clinkering zone at the fired lower end of the kiln cylinder. The kiln gas stream flows counter to the flow of in-process mineral materials from the clinkering zone, through the intermediate calcining zone and the mineral drying/preheating zone and out the upper gas exit end of the kiln into a kiln dust collection system. The flow of kiln gases through the kiln can be controlled to some extent by a draft induction fan positioned in the kiln gas exhaust stream. Over the last 10-20 years preheater/precalciner cement kilns have proven more energy efficient than the traditional long kilns. In preheater/precalciner kilns the raw mineral feed is heated to calcining temperatures in a stationary counterflow preheater/precalciner vessel before it drops into a heated rotary vessel for the higher temperature clinkering reactions.

Some kiln operators have experimented with selective non-catalytic reduction (SNCR) as a method to reduce nitrogen oxide ($NO_X$) emissions. SNCR has shown to be an effective and retrofittable $NO_X$ control technique, as discussed in "A Mode for Prediction of Selective Noncatalytic Reduction of Nitrogen Oxides by Ammonia, Urea, and Cyanuric Acid with Mixing Limitations in the Presence of CO" by Brower et al., Twenty Sixth Symposium (International) on Combustion/The Combustion Institute, 1996, pp. 2117-2124, the entirety of which is hereby incorporated by reference. SNCR has been demonstrated in cement kilns where a continuous stream of urea or ammonia can be introduced into cement kilns in the critical temperature region where the SNCR reaction takes place, 900° C. to 1100° C. In preheater/precalciner cement kilns the critical temperature zone is in the stationary portion of the preheater/precalciner, downstream of the rotary kiln, where it is practical to introduce a continuous stream of ammonia or urea solution across the gas stream. In conventional long process cement kilns the exhaust gas temperature is typically less than 600° C., well below the minimum 900° C. required for the SNCR reaction to occur. In some long kilns, concepts have been suggested to inject urea from the gas discharge end of the kiln under high velocity in order to reach the necessary temperature zone, such as described U.S. Pat. No. 5,728,357. However, to the extent that such a method is even effective, it is not practical for kilns where it is not possible to inject the urea to the critical temperature zone from the end of the kiln due to the existence of internal heat exchange apparatus like a chain system or the distance is simply too far (i.e., over 50 meters).

As such, it has also been attempted to introduce urea through an opening in the wall of the rotating kiln. For example, urea prills have been introduced through an opening in the kiln wall, such as through the tire drop tube. However, no significant response (i.e., $NO_X$ reduction) was observed. This is not surprising even when the urea addition point is in the correct temperature range. This is true for a number of reasons. For example, the opportunity for the introduction of urea through an opening in the kiln wall only happens once per revolution in the current tire injection drop tubes. Long dry kilns typically rotate once every 45 seconds. The gas velocity where the temperatures are between 900° C.-1100° C. is about 6 to 10 meters per second. The total gas residence time in the critical temperature range for SNCR to occur is in the range of about 3 seconds. Urea is commercially available primarily in the form of prills of 1 mm to 2 mm diameter since the primary use is as a fertilizer (prills facilitate spreading) or for dissolving into a water solution such as used for aqueous injection of urea for SNCR (where prills facilitate dissolution). The addition of the prills into a gas stream of 900°-1100° C. results in almost instantaneous volatilization of the urea (which has a dissociation temperature of 133° C.) because of the high surface area exposed to transfer heat from the kiln gas or from the mineral bed at 800° C. in which it may come in contact. Therefore, a charge of urea prills treats the kiln gas for only a small portion of time between charges, probably at most for only one or two seconds. Thus, in the 45 seconds between charges, there is only a few seconds where volatiles are being released from the urea and the majority of kiln gasses miss the treatment.

An additional problem to be overcome in the implementation of SNCR is the stratification of the kiln gasses. In the zone of the kiln where the gas temperature is 900°-1100° C., the material temperature at the bottom of the kiln is at the calcining temperature of 850° C. and is liberating $CO_2$ at a molecular weight of 44 vs. 30 for the kiln gas. Because of the gas density difference, the gasses at the bottom of the kiln stay at the bottom so there is a large temperature difference between the gasses at the bottom and those at the top of the kiln. Further, the added urea will fall to the mineral bed at the bottom of the kiln where it will release its volatiles. These volatiles will tend to stay at the bottom of the kiln and not treat the full gas cross section resulting in slipping by of the gasses at the top of the kiln which will leave the kiln untreated. Typically, long kilns are 4 to 6 meters in diameter and the gas velocities are 6 to 10 meters per second.

Typically, preheater/precalciner kilns utilizing SNCR use aqueous ammonia or aqueous urea. Aqueous ammonia generally cost about $700 per ton of ammonia. Anhydrous ammonia (ammonia gas) is significantly less expensive at $400 per ton. However, the more cost effective anhydrous ammonia is not generally used for a number of reasons. Firstly, anhydrous ammonia must be handled as a hazardous material. This involves certain regulatory reporting requirements and the like. Moreover, anhydrous ammonia is difficult to mix into the entire cross section of the kiln gasses in the kiln duct.

SUMMARY

According to one aspect of the present disclosure, a reducing agent, such as urea or ammonia, is introduced into a mineral processing kiln to reduce $NO_X$ emissions by SNCR. The SNCR reducing agent may be introduced as a gas, liquid, or solid. Moreover, the SNCR reducing agent may be introduced as the gaseous decomposition products of a liquid or solid.

In another aspect of the present disclosure, the introduction of the SNCR reducing agent is complemented by high energy/velocity air that is injected into the kiln gas stream. The SNCR reducing agent may be introduced with the pressurized air or separately therefrom. In either such case, the pressurized air both reduces, or even eliminates, stratification of gases in the mineral processing kiln, while also distributing the SNCR reducing agent across the cross section of the kiln.

The high energy/velocity air is injected into the rotary vessel at a velocity of about 100 to about 1000 feet per second, typically from an air pressurizing source providing a static pressure of greater than about 0.15 atmospheres, and in one aspect of the present disclosure, at a point along the lower one-half length of the rotary vessel, where the temperature difference between the kiln gases and the mineral are the greatest, to mix the gas released from the mineral with combustion gases from the primary burner. The mass flow rate of the injected air is about 1 to about 15% of the mass rate of use of combustion air by the kiln.

In a specific exemplary aspect of the disclosure, there is described a method of implementing SNCR in a conventional long kiln including cement, lime, lightweight aggregate, lime sludge, taconite, and other mineral processing kilns. Urea is introduced through the wall of the rotary vessel of the kiln. Urea, its byproducts, ammonia, or other ammonia containing materials may be introduced (in the form of a gas, solid, or liquid) by the use of a stationary plenum. Alternatively, urea, its byproducts, ammonia, or other ammonia containing materials may be introduced (in the form of a gas, solid, or liquid) by use of a plurality of drop tubes. Other mechanisms for introducing urea, its byproducts, ammonia, or other ammonia containing materials may also be used.

According to another aspect, the application of SNCR for the reduction of NOx emissions in a preheater/precalciner cement kiln or other mineral processing kiln is accomplished by using anhydrous ammonia (ammonia gas) as the reducing agent. The ammonia gas is mixed into a high-pressure (i.e., compressed) air stream in a concentration range of 0.1% to 10% by volume of ammonia. This mixture is injected into the process vessel or stationary duct at a velocity of about 30% of the speed of sound to the speed of sound through one or more nozzles. In such a way, stratified kiln gases are mixed (i.e., de-stratified) and ammonia is mixed with the kiln gases.

In one exemplary embodiment, the compressed air stream containing 1% to 10% by volume of ammonia is injected into the duct or vessel at 50% to 100% of the speed of sound through one or more nozzles.

BRIEF DESCRIPTION OF THE DRAWINGS

FIGS. 1-6 illustrate an exemplary embodiment of a mineral processing kiln that has been modified for the reduction of $NO_X$ emissions by SNCR;

FIGS. 7 and 8 illustrate another embodiment of a mineral processing kiln that has been modified for the reduction of $NO_X$ emissions by SNCR;

FIGS. 9-12 illustrate yet another embodiment of a mineral processing kiln that has been modified for the reduction of $NO_X$ emissions by SNCR;

FIGS. 13 and 14 illustrate another embodiment of a mineral processing kiln that has been modified for the reduction of $NO_X$ emissions by SNCR;

FIGS. 30 and 31 illustrate a mineral processing kiln that has been modified for the reduction of $NO_X$ emissions by SNCR by use of a solid material feeder.

DETAILED DESCRIPTION OF THE DRAWINGS

Figure 3:
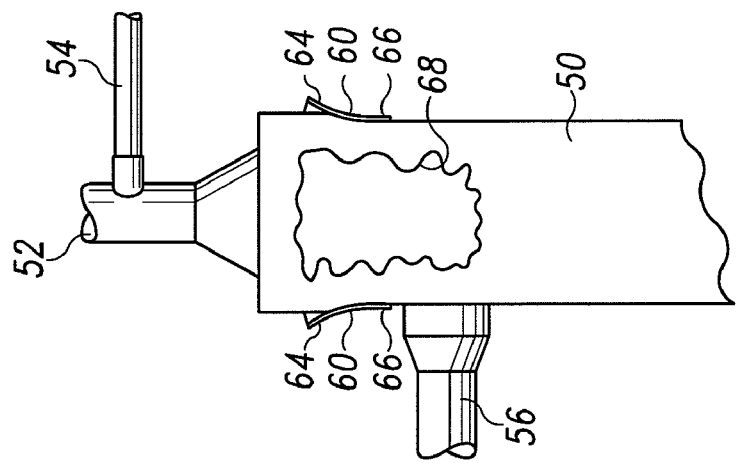
Figure 2:
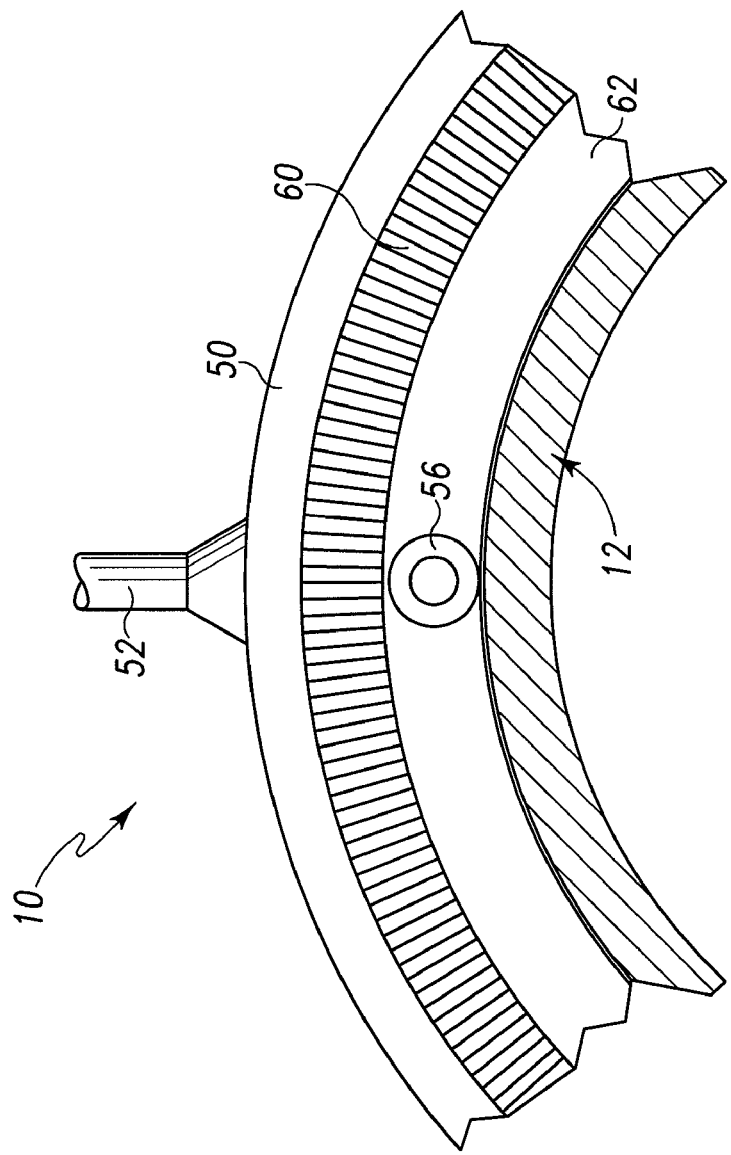

In accordance with the concepts of the present disclosure, a reducing agent is introduced into a mineral processing kiln to implement selective non-catalytic reduction (SNCR) as a method to reduce nitrogen oxide ($NO_X$) emissions. In many embodiments, the introduction of the reducing agent is complemented by the introduction of pressurized air that is injected into a mineral processing kiln to deliver energy to the gases in the kiln to achieve cross sectional mixing of the kiln gases and the SNCR reducing agent. In such a way, by introducing an SNCR reducing agent with the injection of pressurized air, the stratification of gases in a kiln is reduced, or even eliminated, while, at the same time, the SNCR reducing agent is introduced across the cross section of the kiln. The injected high-pressure air provides energy for mixing the gases being liberated from the in-process mineral with the combustion gases coming from the combustion zone of the kiln, while the SNCR reducing agent reduces $NO_X$ emissions. Examples of the injection of pressurized air into mineral processing kilns to reduce the stratification of gases in the kiln are disclosed in commonly owned U.S. Pat. No. 6,672,865, along with U.S. patent application Ser. No. 11/137,288, which was filed on May 25, 2005, the entirety of both of which is hereby incorporated by reference.

The concepts of the present disclosure may be used to implement SNCR in both conventional long kilns and preheater/precalciner kilns. Materials typically processed in such kilns are Portland cement raw materials, clays, limestone, taconite, and other mineral materials that are thermally processed and liberate gases upon heating.

In many of the embodiments described herein, the source of SNCR reducing agent is remote from the rotary vessel of the mineral processing kiln. What is meant herein by the term "remote" as it relates to the relationship of the source of SNCR reducing agent relative to the rotary vessel is that the source of the SNCR reducing agent is not secured to the rotary vessel, and, as such, does not rotate with the rotary vessel. As such, the source of SNCR reducing agent may be embodied as a tank, reservoir, vessel, hopper, or the like that is spaced apart from the rotary vessel and contains a solid, gaseous, or liquid SNCR reducing agent and supplies the SNCR reducing agent to the rotary vessel during operation of the mineral processing kiln. For example, in some of the embodiments described herein, an SNCR reducing agent is supplied from a remote source to a rotating or stationary plenum and thereafter drawn into the rotary vessel. By use of a source of SNCR reducing agent that is remote from the rotary vessel, the source of SNCR reducing agent can be, for example, refilled without interruption of kiln operation. This is distinct from designs in which a tank or the like is secured to the rotary vessel.

Referring now to FIGS. 1-6, a mineral processing kiln 10 includes a rotary vessel 12 having a cylindrical wall 14, a lower combustion air inlet/burner end 16, and an upper gas exit end 18. In operation, raw mineral feed 20 is delivered to the gas exit end 18, and, with rotation of the rotary vessel 12, the mineral bed moves from the gas exit end 18 toward the air inlet/burner end 16. In such a way, the mineral flows countercurrent to combustion products forming the kiln gas stream. A burner 24 is supplied from a primary fuel source 26, and combustion air is drawn from a heat recuperator 30, through a hood 28, and into the combustion air inlet end 16. The processed mineral exits the combustion air inlet end 16 and is delivered to the heat recuperator 30. One or more air injection tubes 32 in air flow communication with an air pressurizer such as a fan, blower or compressor 34 (hereinafter, for ease of description, fan 34) are located along the length of the rotary vessel 12 at points where the in-process mineral in the mineral bed 22 is calcining or where the temperature differences between the kiln gas stream and the mineral bed 22 are the most extreme, most typically in the lower most one-half portion of the rotary vessel 12, the portion more proximal to the combustion air inlet/burner end 16 than the gas exit end 18. The air injection tubes 32 terminate in the rotary vessel as a nozzle 36 positioned to direct the injected air along a path designed to impart rotational momentum to the kiln gas stream. The orifice 38 of the nozzle 36, in one exemplary embodiment, has an aspect ratio greater than one.

The mineral processing kiln 10 may be embodied to burn supplemental fuel, such as used tires, delivered from a supplemental fuel source 40 through a fuel delivery device 42 into the rotary vessel 12 to burn in contact with the in-process mineral in the mineral bed 22. In one exemplary embodiment, air is injected to impart rotational momentum to the kiln gas stream at a point between such a fuel delivery device 42 and the combustion air inlet/burner end 16. Alternatively, air may be injected at one or more additional points along the rotary vessel 12 at locations between such a supplemental fuel delivery device 42 and the gas exit end 18.

Figure 4:
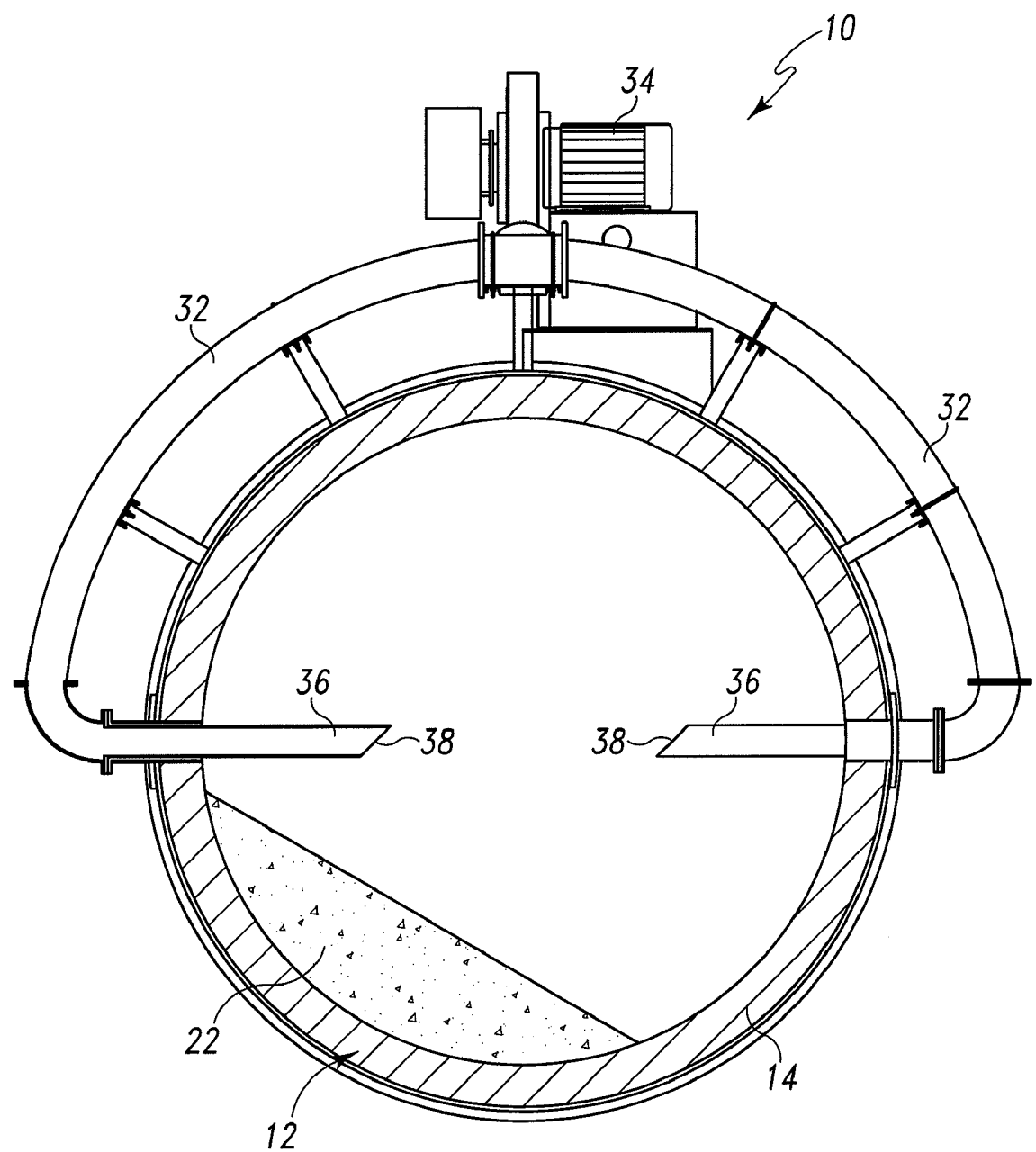

As shown in FIG. 4, two or more of the air injection tubes 32 may extend through the cylindrical wall 14 of the rotary vessel 12. Pressurized air is delivered to the injection tubes by the fan 34. The air injection tubes 32 terminate in the kiln at a point between the top of the mineral bed 22 and the axis of rotation of the rotary vessel 12 to direct high energy injected air into the rotary vessel to impart rotational momentum to the kiln gas stream. By injecting high energy air into the kiln to produce rotational momentum in the kiln gas stream, supplemental fuel elements, such as tires, burning in the kiln gas stream are continuously cleared of their own combustion products and contacted with mixed kiln gases to provide more favorable conditions for combustion and energy transfer.

Injection of high energy mixing air effective to impart rotational momentum in the kiln gas stream works to dissipate stratified layers produced, for example, by calcining mineral in the mineral bed 22. With removal or dissipation of the more dense carbon dioxide strata normally covering the mineral bed 22, radiant energy from the kiln gas stream and the cylindrical walls 14 of the rotary vessel 12 reaches the bed to allow more efficient energy transfer between the kiln gas stream and the end process mineral.

The mineral processing kiln 10 has been modified for the implementation of SNCR. In particular, the fan 34 injects air, along with gaseous ammonia, the gaseous decomposition products of urea, or some other SNCR reducing gas, into the rotary vessel 12. A stationary plenum 50 surrounds the wall 14 of the rotary vessel. Ambient air is introduced into the plenum 50 through an air inlet 52. The plenum 50 is fluidly coupled to a source 48 of an SNCR reducing agent. In the exemplary embodiment of FIGS. 1-6, gaseous ammonia, the gaseous decomposition products of urea, or some other SNCR reducing gas from the source 48 is introduced into the plenum 50 through a gas inlet 54. Air and the gaseous ammonia, gaseous decomposition products of urea, or some other reducing gas are then drawn through an outlet 56, and a conduit 58 by the fan 34, and thereafter injected into the rotary vessel 14 through the injection tubes 32. The outlet 56 and the conduit 58 are secured to the intake of the fan 34 and hence rotate along with the vessel 12 relative to the stationary plenum 50. The injected air and gaseous ammonia (or gaseous decomposition products of urea or some other SNCR reducing gas) then reduce the stratified kiln gases in the manner described herein. In other words, the system of FIGS. 1-6 functions to not only mix the stratified kiln gases (as described in the numerous other embodiments described herein), but also functions to reduce $NO_X$ emissions by the introduction of the SCNR reducing agent.

A pair of mechanical seals 60 seal the interface between the stationary plenum 50 and a pair of rotating face plates 62. The inner diameter surface of each of the face plates 62 is secured to the outer surface of the wall 14 of the rotary vessel 12. As such, the face plates 62 rotate with the rotary vessel 12. The mechanical seal 60 is constructed of spring steel. Like the face plates 62, the mechanical seal 60 is ring shaped with is outer diameter portion 64 being secured to the stationary plenum 50 (see FIG. 3). The inner diameter portion 66 of the mechanical seals 60 is biased against the respective outer surfaces of the face plates 62 (see FIG. 3). In such a way, an internal volume 68 is defined by (i) the plenum 50, (ii) the outer surface of the vessel wall 14, (iii) the seal 60, and (iv) the face plates 62. One of the face plates 62 has a hole defined therein. The outlet 56 is secured to this face plate 62 so that the internal volume 68 is in fluid communication with the conduit 58.

It should be appreciated that other assemblies may be used to introduce gaseous ammonia, the gaseous decomposition products of urea, or some other SNCR reducing gas, into the rotary vessel 12. For example, commonly owned U.S. Pat. No. 5,451,255 discloses a number of methods and devices for removing a portion of the kiln gases from a kiln as part of a bypass system. Such methods and devices, with or without modification thereto, may be used to introduce gaseous ammonia, the gaseous decomposition products of urea, or some other SNCR reducing gas, into the rotary vessel 12 (or into a conduit similar to the conduit 58 for introduction into the rotary vessel 12 by the fan 34).

In the exemplary embodiment of FIGS. 1-6, gaseous ammonia, gaseous decomposition products of urea, or some other SNCR reducing gas may be introduced into the rotary vessel 12 throughout the duration of the entire revolution of the vessel 12. A number of different sources 48 of the gaseous ammonia, the gaseous decomposition products of urea, or some other SNCR reducing gas may be used. For example, gaseous ammonia may be supplied from a pressurized tank or ammonia generator. The gaseous decomposition products of urea may be supplied from an external pyrolysis chamber located near the mineral processing kiln 10.

Alternatively, solid or aqueous urea may be introduced into the stationary plenum 50. As shown in FIGS. 7 and 8, a solid material inlet or hopper 70 may be used to introduce solid materials, such as urea prills, into the plenum 50. An air lock device 72 may be used to prevent air and gases from escaping the plenum 50. Aqueous urea may be introduced through the gas inlet 54. It should be appreciated that a given design may include only one of the gas/liquid inlet 54 and the solid material inlet 70, or both. In the embodiment shown in FIGS. 7 and 8, air is introduced into the plenum 50 through an air inlet 74, with the inlet flow being modulated by a control valve 76, although other air inlet methods and devices may be used. In one exemplary embodiment, the solid or aqueous urea is introduced into the plenum 50 where it contacts the hot outer surface of the wall 14 of the rotary vessel 12 and undergoes pyrolysis to gaseous products inside the plenum 50. From there, the gaseous decomposition products are drawn into the rotary vessel 12 by the fan 34 in the manner described above. The direct pyrolysis of urea in the plenum 50 is somewhat dependant on the temperature of the outer surface of the wall 14 of the rotary vessel 12. Typically, the outer surface of the wall 14 of the rotary vessel 12 in the zone where the plenum 50 is positioned has a temperature of about 250° C. However, with the movement of air due to the draft of the fan 34 and the heat capacity of the urea or urea solution, there may not be sufficient heat transfer from the interior of the kiln to maintain sufficient temperature to accomplish the pyrolysis in certain existing kiln designs. A modification of the refractory material that lines the inside of the wall 14 of the rotary vessel 12 may be made to ensure that adequate heat conduction is maintained to keep the outer surface of the wall 14 of the rotary vessel 12 sufficiently hot to accomplish urea pyrolysis. Such modification may be made to the entire rotary vessel 12 or only to the area of the vessel 12 proximate to the stationary plenum 50. In an exemplary embodiment, the rotary vessel 12 is designed such that the temperature of the outer surface of the wall 14 of the rotary vessel 12 is maintained between 250° C. to 350° C.

In another exemplary embodiment, the plenum 50 around the rotary vessel 12 is fed with urea prills. The solid material falls to the bottom of the stationary plenum 50 where it collects in a pan 78. The pan 78 is heated by the rotary vessel 12, although, if need be, the pan 78 may be heated with supplemental electric strip heaters, steam, or the like to maintain a temperature that is sufficiently hot to continuously pyrolize the urea. The urea prills undergo pyrolysis in the pan 78, with the gaseous decomposition products thereof then being drawn into the rotary vessel 12 by the fan 34 in the manner described above. The urea prills may be added at the 12 o'clock position of vessel rotation, or alternatively at the 3 or 6 o'clock position, and would fall directly to the bottom of the plenum 50 which is heated sufficiently to pyrolize the urea as fast as it is fed. The location of the air inlet 74 allows the incoming ambient air to sweep the pyrolysis area (i.e., the intake air is drawn through the pan 78).

It should be appreciated that the above described methods that utilize the pyrolysis of urea (either externally or within the plenum 50) allow the kiln operator to receive and handle dry or aqueous urea, and thereafter convert it to gaseous ammonia on site in a controlled manner. This allows the kiln operator to avoid handling significant quantities of toxic ammonia at the plant site.

As described above, the stationary plenum 50 allows for efficient use of urea for SNCR by the continuous addition of the reagent relative to the residence time of the gasses in the kiln. The gas residence time in the desired temperature zone is in the range of 1 to 5 seconds. The above described device and method provide effective $NO_X$ reduction since the gaseous ammonia, gaseous decomposition products of urea, or other SNCR reducing gas is introduced during this entire time period. It should be appreciated that effective $NO_X$ reduction may also be achieved by other methods and devices. For example, urea may be introduced into the rotary vessel 12 through one of more of the fuel delivery devices 42. Exemplary fuel delivery devices which may be used are the fuel delivery devices disclosed in commonly owned U.S. Pat. Nos. 4,850,290 and 4,930,965, the entirety of both of which is hereby incorporated by reference. For example, the fuel delivery devices 42 may be embodied as any of the drop tubes and associated hardware described in the above-incorporated patents.

Typically, the period of rotation for a long cement kiln is about 40 seconds to 60 seconds. As such, a moderated urea charge may be introduced through a drop tube into the rotary vessel 12 in a form that when it drops into the vessel 12 it takes at least as long as one revolution for it to completely decompose. In such a case, $NO_X$ reduction can be realized, particularly if the released volatiles are well mixed by use of, for example, the injected air methods described herein (e.g., by use of the fan 34 and the associated air injection tube(s) 32).

Hence, to expose the bulk of the kiln gas (on a continuous basis) to the dissociation products of the urea (or other SNCR reducing agent), the volatilization rate of the charge may be moderated so the release of the volatiles lasts for at least the period between charges. Moderation of the release of volatiles may be accomplished by processing the urea into a form to reduce the heat transfer to the urea. Such processing may involve, for example, (i) containerizing or packaging urea (e.g., 1 liter cans or cardboard containers or bags), (ii) briquetteing or otherwise agglomerating urea to reduce the surface area to mass ratio (e.g., forming urea blocks or bricks), (iii) mixing urea with material like kiln dust or alternate solid fuel, and/or (iv) containerizing or agglomerating a mixture of urea and another material to moderate the release of volatiles. Other methods of moderating the release of volatiles which may be used with the concepts of the present disclosure are the methods of moderating the release of volatiles from an added fuel element disclosed in commonly owned U.S. Pat. No. 5,122,189, the entirety of which is hereby incorporated by reference.

An exemplary method of agglomerating urea includes forming 1 kg charges of moistened prills in cardboard containers. Another exemplary method includes mixing 1 part urea with 10 parts kiln dust, with the resultant mixture being placed in a metal 5 gallon can. Another method involves the slight moistening and compression of urea prills. Moreover, the prill manufacturing process may produce an undesirable byproduct of agglomerates that may be suitable for use thereby providing a beneficial disposal source for such manufacturing waste.

In addition to single drop tube designs, it should be appreciated that multiple drop tubes may be used to introduce urea into the rotary vessel. For example, a rotary vessel 12 may be outfitted with two to six drop tubes (or perhaps even more). With an increase in the number of drop tubes, the continuity of urea introduction becomes enhanced. Moreover, a scoop may be secured to the drop tube that is charged with granular urea (e.g., urea prills) when it is at the 9 o'clock position of vessel rotation, then as the scoop on the end of the drop tube reaches the 10:30 position the prills start spilling into the drop tube. This spilling will continue until the drop tube is positioned in about the 1:30 position. Then, assuming the kiln is equipped with 4 such tubes, another recently charged tube reaches the 10:30 position and starts spilling the urea into the drop tube resulting in a more or less a continuous feed of granular urea to the kiln. The degree of uniformity to achieve the desired results may be adjusted by using more or less drop tubes. As with each of the methods described herein, in the case of use of multiple drop tubes, $NO_X$ reduction can be realized, particularly if the released volatiles are well mixed by use of, for example, the injected air methods described herein (e.g., by use of the fan 34 and the associated air injection tube(s) 32).

It is also be possible to inject aqueous urea into the drop tubes through multiple valves and nozzles in a manifold around the kiln in the positions from 10 o'clock to 2 o'clock. As a drop tube rotates under the valve and nozzle, an aliquot of liquid is injected into the drop tube. The liquid mostly impinges on the hot drop tube surface where the moisture quickly evaporates and the solid urea undergoes pyrolysis into its gaseous decomposition products, with such decomposition products then being drawn into the rotary vessel 12 since it is under negative pressure relative to the atmosphere. As with each of the methods described herein, in the case of introduction of aqueous urea into one or more drop tubes, $NO_X$ reduction can be realized, particularly if the released volatiles are well mixed by use of, for example, the injected air methods described herein (e.g., by use of the fan 34 and the associated air injection tube(s) 32).

As described above, the gaseous decomposition products of urea may be introduced into the rotary vessel 12 by the use of the fan 34 and the associated air injection tube(s) 32. It should be appreciated that solid urea may also be introduced into the rotary vessel 12 by the use of the fan 34 and the associated air injection tube(s) 32. To do so, urea prills, powderized urea prills, urea powder, or the like may be introduced into the conduits between the fan 34 and the associated air injection tube(s) 32 (i.e., at a location downstream of the fan 34). Alternatively, powderized urea prills or urea powder may be drawn into the fan 34 and thereafter exhausted into the rotary vessel 12 through the air injection tube(s) 32. In such a case, the grain size of the powder is selected to be efficiently passed through the fan 34. Along this line, if a given design of the fan 34 will pass urea prills, it is not necessary to powderize the urea.

Yet further, the gaseous decomposition products of urea or ammonia could be introduced into the exit gasses of a preheater/precalciner kiln in the jet of high velocity air used to mix the gasses. Many preheater/precalciner kilns are configured to inject aqueous urea into the kiln exit gasses. These applications face the requirement of getting a uniform distribution of urea solution throughout the gasses, thus requiring several nozzles. According to the concepts of the present disclosure, the reducing agent may be introduced in the high-pressure jet thereby resulting in a better distribution of the reducing agent.

Referring now to FIGS. 9-12, there is shown another SNCR system that may be used to inject an aqueous SNCR reducing agent 80 (e.g., ammonia or aqueous urea) into the rotary vessel 12. The embodiment of FIGS. 9-12 allows for the injection of the liquid to be spread throughout 100% of the vessel's rotation. The number and size of the injectors 82 may be designed to fit the needs of a given kiln design. In operation, kiln speed (RPM) and position (P1) are sensed and input to a controller 84 which then calculates the desired time to open the solenoid valve 86 of a given injector 82 to allow the liquid in the header 88 to enter the drop tube 90. The liquid is accelerated through the nozzle 92 and passes through the drop tube 90 and into the center portion of the kiln gases. The controller 84 calculates the appropriate injection time for the next injection station and opens the correct solenoid valve 86 at that time. This process is continued until all six stations shown have cycled (although the system may be embodied with any number of injectors). At that time, the following drop tube 90 is aligned and the controller 84 commences to open the leading solenoid valve 86 to begin the cycle again. One complete revolution of the rotary vessel 12 requires three cycles of the injectors 82 for a total of eighteen injections, in this exemplary embodiment. The rate for energizing each of the solenoid valves 86 is dependent upon the vessel speed and therefore will increase when the vessel speed is increased, and will decrease when vessel speed is decreased.

Figure 11:
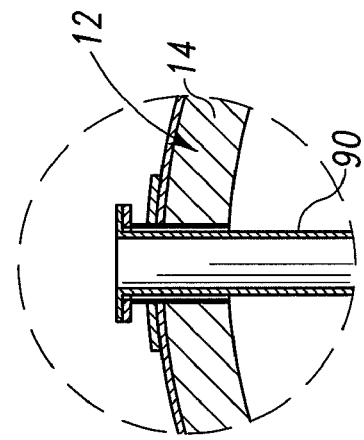
Figure 12:
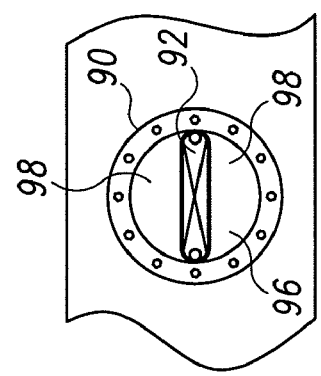
Figure 10:
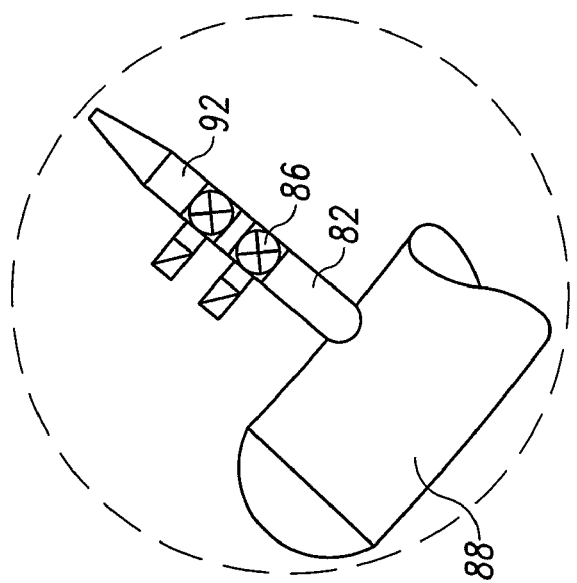

As shown in FIGS. 11 and 12, the cover plate for the drop tube 90 may include an opening that allows the jet of aqueous solution to enter the rotary vessel 12. This opening in the cover plate may act as a septum 96 which separates the inlet area into two containment vessels 98. The containment vessels 98 may be used to capture any liquid not successfully making the transit from the nozzle 92 to the inside of the rotary vessel 12. The liquid will then be carried toward the top of the vessel 12 with the vessel's rotation and dumped into the inside of the vessel 12 as it passes through the upper 120 degrees of its rotation.

In an exemplary construction of the embodiment of FIGS. 9-12, the following physical parameters may be used:

| | |
|---|---|
| VESSEL DIAMETER | 12'-0" |
| VESSEL SPEED | 90 RPH |

| | |
|---|---|
| DROP TUBE DIA. | 18" |
| NOZZLE DIAMETER | 1.5" |

The injection system for this configuration is expected to inject 17 to 23 tons of liquid per hour. It should be appreciated, however, that the capacity will change with any change in physical parameters.

Another SNCR system that may be used to inject an SNCR reducing agent (e.g., ammonia or aqueous urea) into the rotary vessel 12 is shown in FIGS. 13 and 14. The system of FIGS. 13 and 14 is similar to other systems described here in that the SNCR reducing agent is introduced at location in the kiln with a desirable temperature (e.g., 1700-1800° F.), with the rotary joint being used to provide a constant supply of either gaseous or liquid reducing agent. The system of FIGS. 13 and 14 also facilitates kiln gas mixing within the kiln (i.e., de-stratification). As shown in FIG. 14, a reductant supply injector 100 is incorporated within the flange of the injection tubes 32 so that the SNCR reducing gas and/or liquid is introduced into the injection tube 32. The discharge of the injector 100 terminates on the center line of the injection tube 32 and introduces the SNCR reducing agent into the pressurized air stream. The injector 100 may be equipped with an atomizing nozzle to enhance mixing capabilities. The SNCR reducing agent is then accelerated along with the mixing air through the nozzle orifice of the injection tube and homogeneously mixed with the kiln gas. It should be appreciated that such an arrangement may also be used to introduce components other than an SNCR reducing agent into the kiln. For example, liquid and/or gaseous fuel or waste water may be introduced by the injector 100 and delivered into the kiln by the high-pressure air stream from the injection tube.

Figure 15:
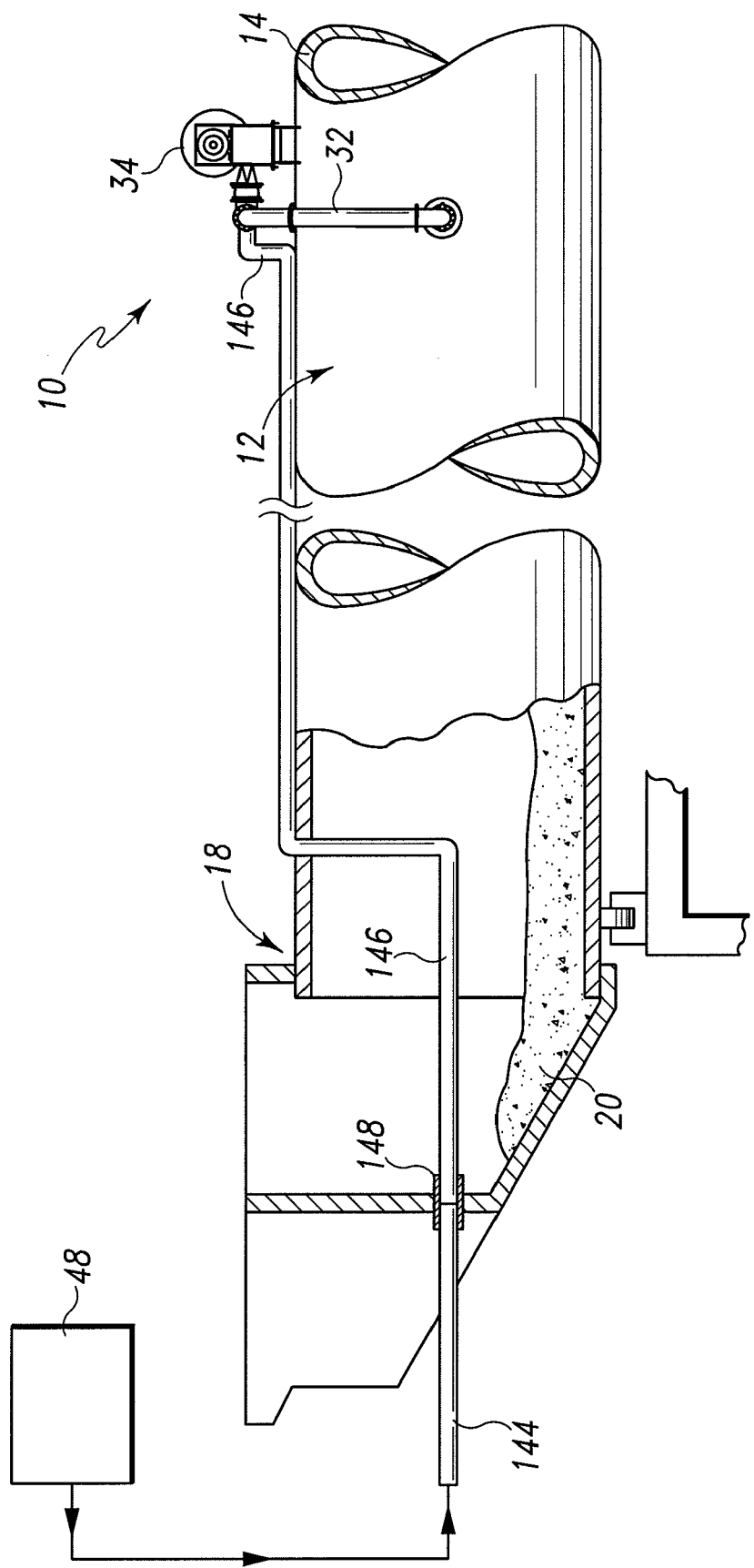
FIG. 15 illustrates another embodiment of a mineral processing kiln that has been modified for the reduction of $NO_X$ emissions by SNCR.

Another SNCR system that may be used to introduce an SNCR reducing agent (e.g., aqueous ammonia or aqueous urea) into the rotary vessel 12 is shown in FIG. 15. In this embodiment, a supply pipe 144 is arranged along the rotary axis of the kiln and enters the upper end 18 of the mineral processing kiln 10. A first end of the supply pipe 144 is coupled to the source 48 of SNCR reducing agent, in this exemplary case, a tank of aqueous ammonia or aqueous urea. A second end of the supply pipe 144 is coupled to a second supply pipe 146 via a rotary coupling 148. The supply pipe 146 exits through the wall 14 of the rotary vessel 12 and runs along the length of the vessel. The supply pipe 146 is coupled to the outlet of the fan 34. For example, the supply pipe 146 is coupled at a point between the fan 34 and the branch of the injection tubes 32, as shown in FIG. 15. In such a way, a liquid SNCR reducing agent (e.g., aqueous ammonia or aqueous urea) may be supplied to the pressurized side of the fan from a remote source of an SNCR reducing agent.

Moreover, it should be appreciated that in the exemplary embodiment of FIG. 15, as with many of the other embodiments described herein, the SNCR reducing agent may be introduced into the stream of high-pressure air from the fan 34 from a location within the rotary vessel 12. For example, in the case of the embodiment of FIG. 15, in lieu of coupling the terminal end of the supply pipe 146 to the outlet of the fan 34, the terminal end may be inserted into the rotary vessel 12 at a location that is upstream of the fan 34 (relative to the flow of kiln gases with the rotary vessel 12). In other words, the terminal end of the supply pipe 146 may extend into the rotary vessel 12 at a location between the lower end 16 of the of the mineral processing kiln 10 and the nozzles 36. In such a way, the SNCR reducing agent is introduced into the rotary vessel 12 at an upstream location where it is carried downstream by the kiln gases and into contact with the high-pressure air stream from the nozzles 36 where it is mixed, along with the kiln gases, throughout the cross section of the rotary vessel 12.

As described above, anhydrous ammonia, vaporized aqueous ammonia, or other SNCR reducing gases such as the pyrolysis products of urea, may be mixed in a manifold at the fan inlet and subsequently introduced into the kiln's rotary vessel 12. Another exemplary implementation of this concept is shown in FIGS. 16-20. Unlike the arrangement of FIGS. 1-8 in which the plenum 50 is stationary, in the exemplary implementation of FIGS. 16-20, a plenum 102 is secured to the wall 14 of the rotary vessel 12 and hence rotates with the vessel 12. An outlet 104 of the plenum 102 is fluidly coupled to an intake of the fan 34 by the conduit 58. As such, the plenum 102, the fan 34, and the conduit 58 rotate with the rotary vessel 12. As shown in FIG. 18, the plenum 102 has an annular slot 106 formed therein. In the exemplary implementation of FIGS. 16-20, the annular slot 106 is formed in the side of the plenum 102 opposite the outlet 104, although it is contemplated to form the slot in the same side as the outlet 104.

Figure 17:
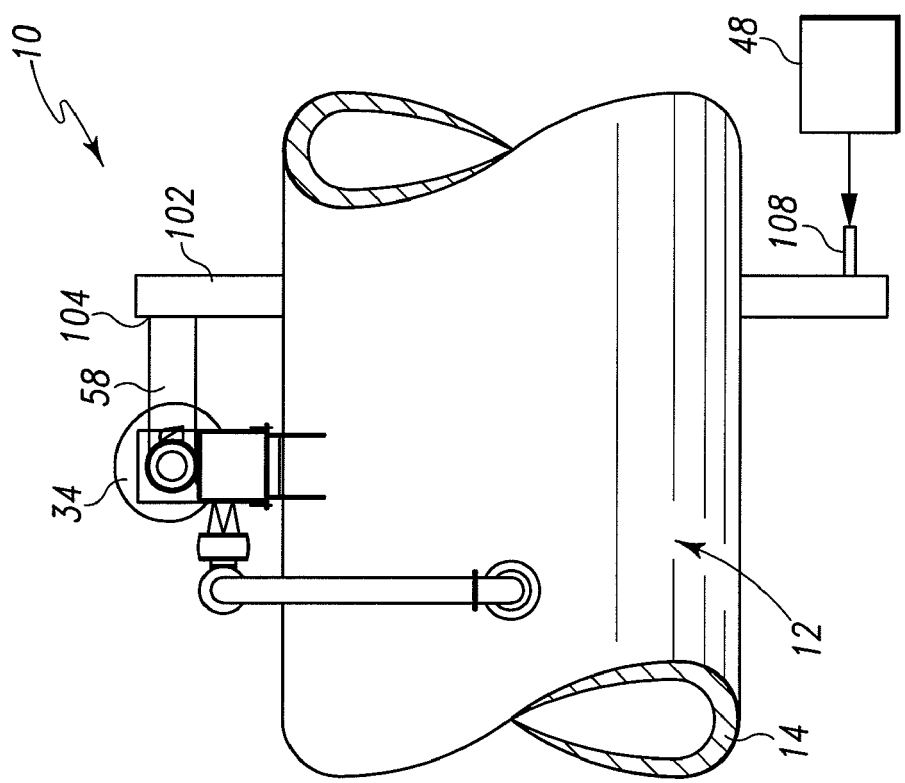
FIGS. 16-20 illustrate a further embodiment of a mineral processing kiln that has been modified for the reduction of $NO_X$ emissions by SNCR.
Figure 16:
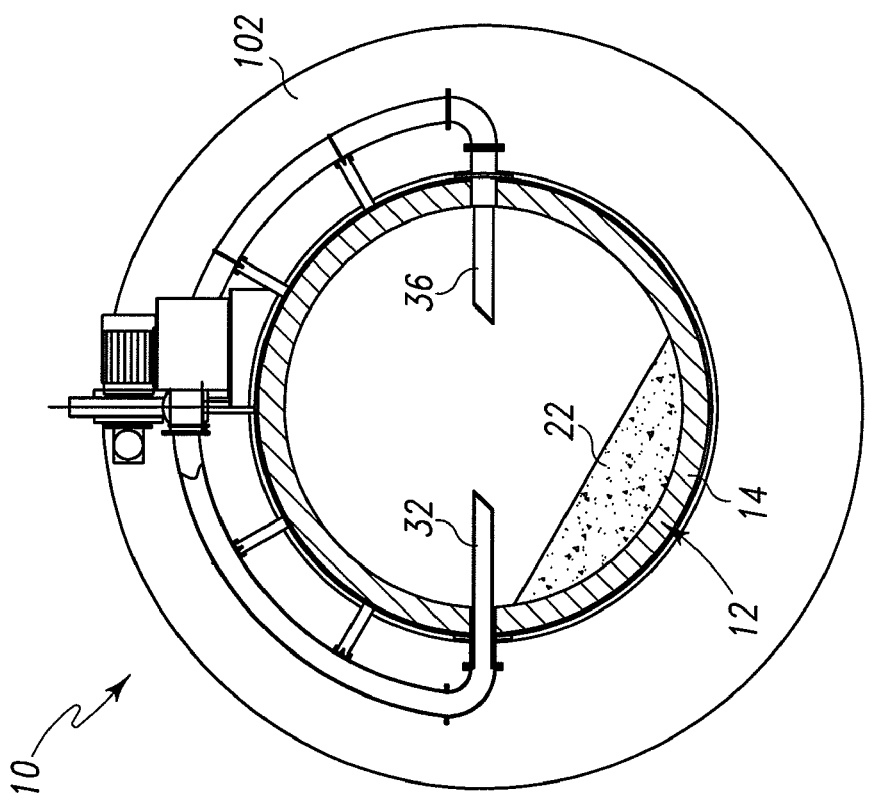
Figure 19:
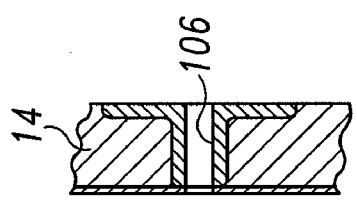
Figure 20:
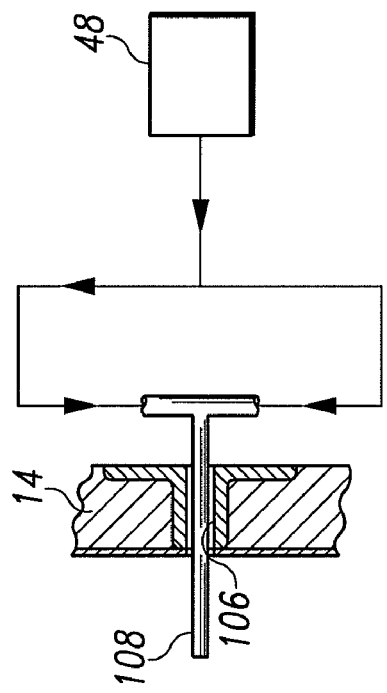
Figure 18:
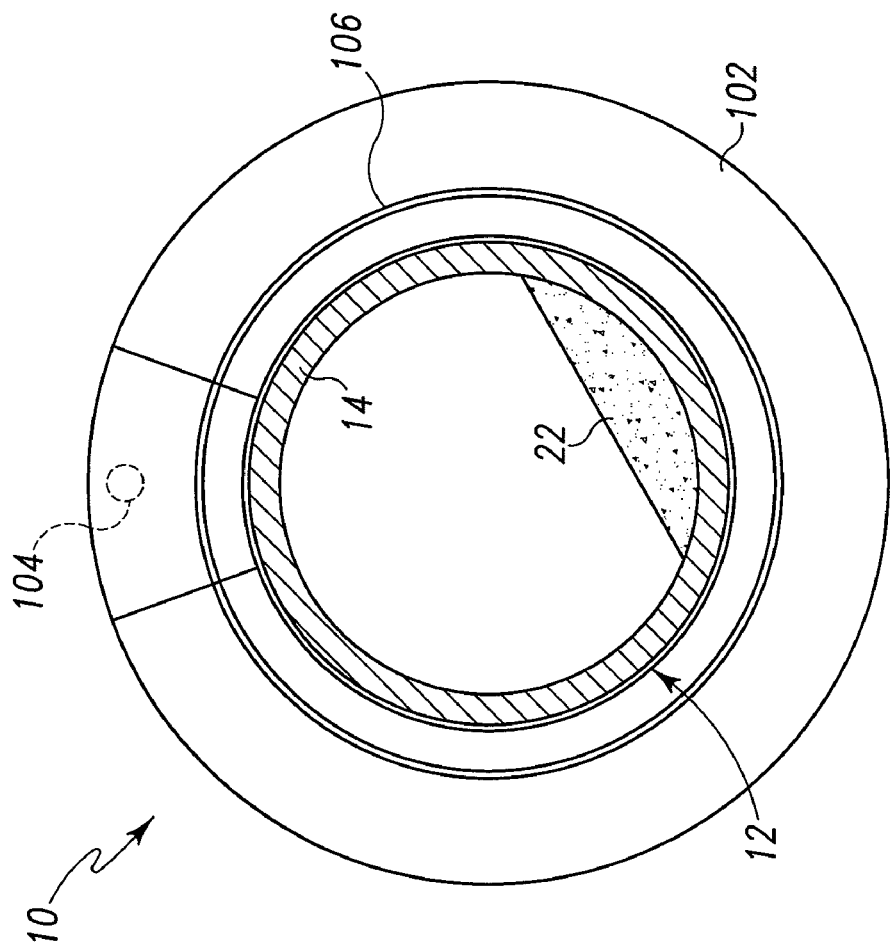
Figure 22:
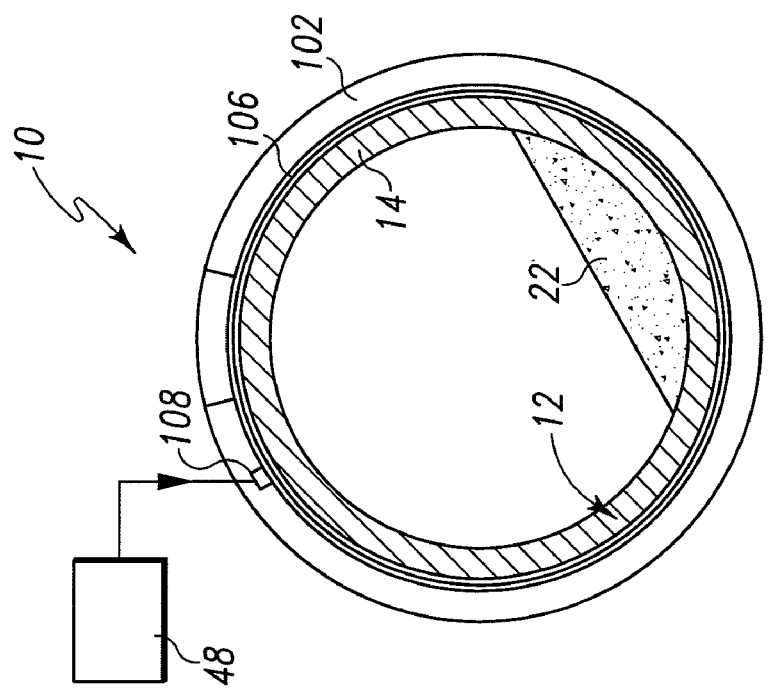
FIGS. 21-23 illustrate yet another embodiment of a mineral processing kiln that has been modified for the reduction of $NO_X$ emissions by SNCR.
Figure 21:
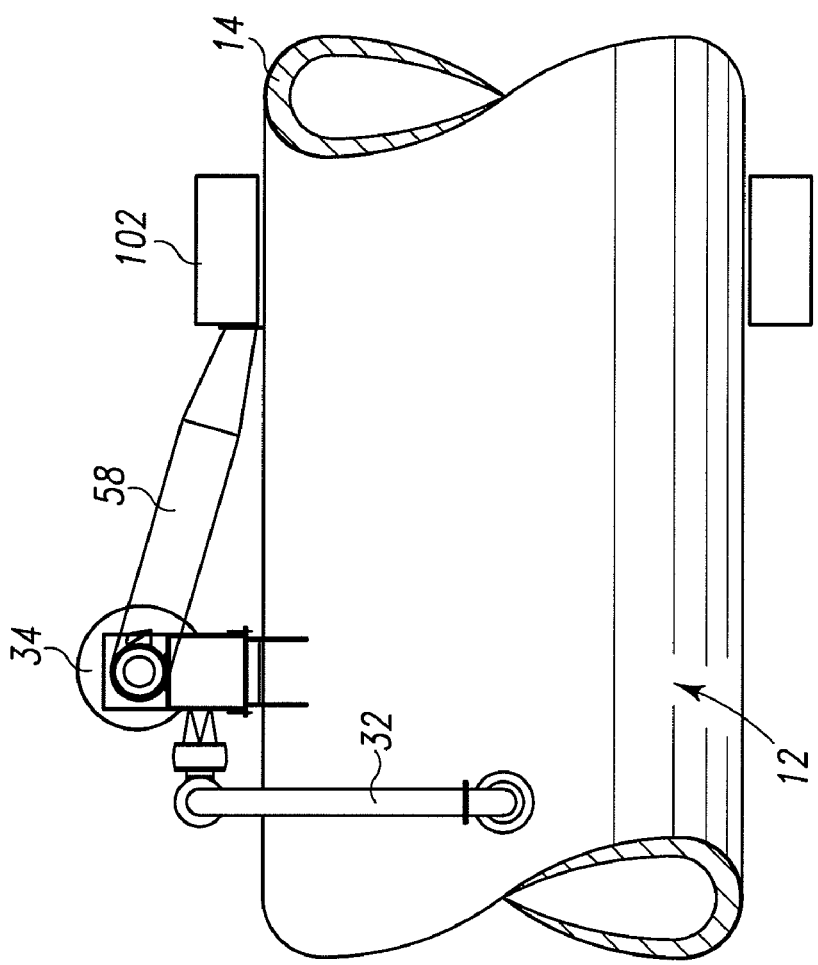
Figure 23:
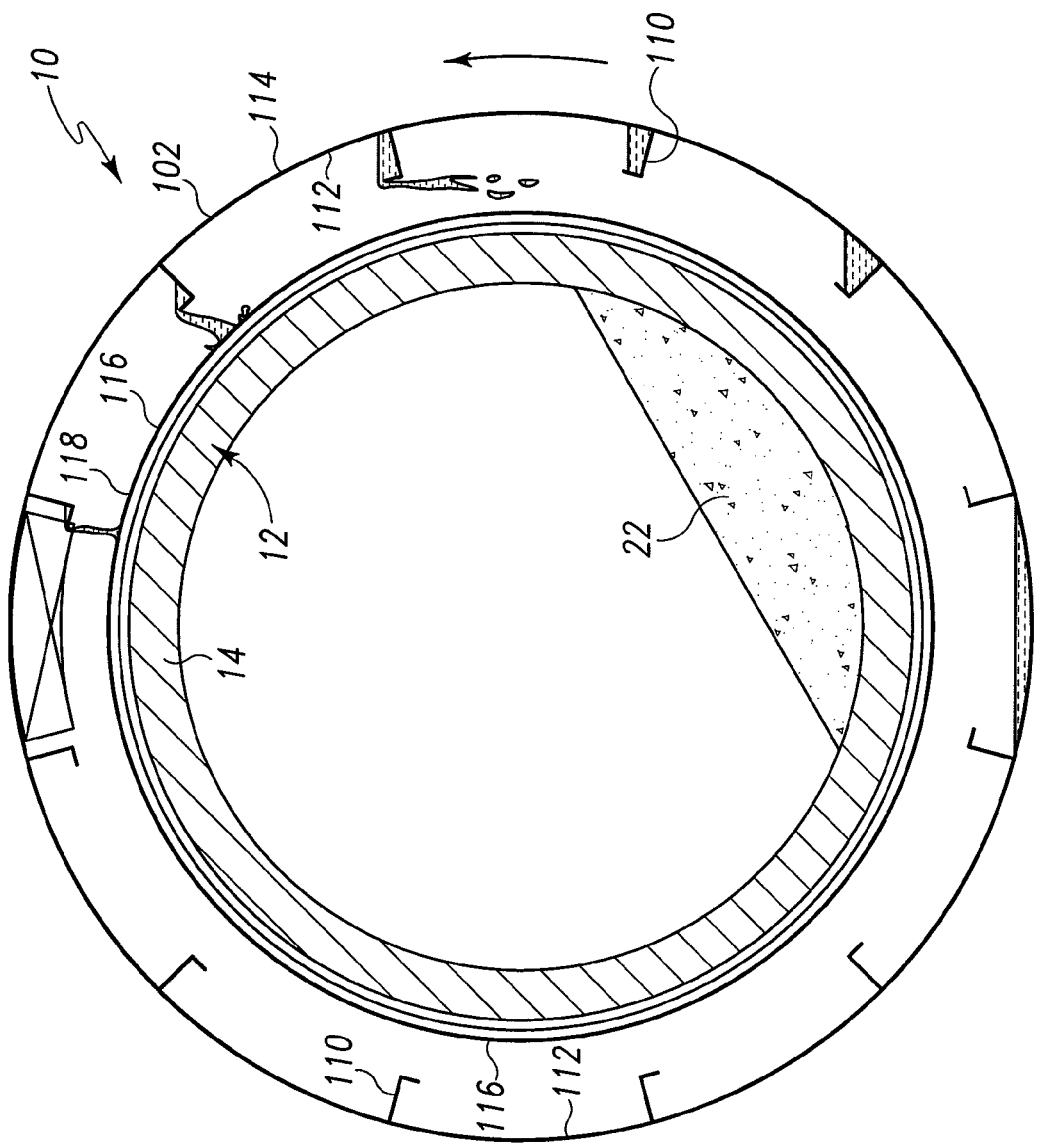

As shown in FIGS. 17 and 20, an injector nozzle 108, or other gas and/or liquid input device, extends into the slot 106. The injector nozzle 108 is stationary and hence rides within the slot 106 during rotation of the rotary vessel 12. Anhydrous ammonia, the gaseous decomposition products of urea, or some other SNCR reducing gas is introduced into the plenum 102 via the injector nozzle 108. Outside, ambient air is also drawn into the plenum 102 through the slot 106 where it is mixed with the anhydrous ammonia (or other SNCR reducing gas). The mixed air and anhydrous ammonia (or other SNCR reducing gas) are drawn through the outlet 104 of the plenum 102 and the conduit 58 by the fan 34, and thereafter injected into the rotary vessel 12 through the injection tubes 32.

The injector nozzle 108 may extend into the plenum 102 at any of numerous locations. For example, as shown in FIG. 17, the injector nozzle 108 extends into the plenum 102 near the bottom of the plenum (e.g., at the 6 o'clock position). However, other locations may be used to fit the needs of a given kiln design.

It should be appreciated that one or both of the fan 34 and the slot 106 may be configured to maintain negative pressure within the plenum 102. By doing so, the anhydrous ammonia (or other SNCR reducing gas) is prevented from escaping the plenum 102 through the slot 106. In one exemplary embodiment, the slot 106 is configured with a ½" width and a 14' diameter. In such a configuration, air velocities generated by typical fans, blowers, or compressors are more than sufficient to generate the negative pressure necessary to prevent the anhydrous ammonia (or other SNCR reducing gas) from escaping the plenum 102 through the slot 106. In an exemplary embodiment, the fan 34 may be used to generate an air intake velocity of 17-40 feet per second.

It should also be appreciated that the size of the slot 106 may be configured to allow for the desired mass flow of air to be supplied to the fan 34. In other words, a system configuration may be designed which satisfies the required mass flow of air for kiln operation while also maintaining negative pressure within the plenum 102. However, if a given kiln design requires an air mass flow beyond what can be drawn through a given slot design, a supplemental air inlet may be coupled to the intake of the fan 34.

As alluded to above, in addition to SNCR reducing gases, aqueous SNCR reducing agents may also be introduced via the injector nozzle 108. In addition, other configurations may be used to facilitate use of aqueous SNCR reducing agents.

For example, as shown in FIGS. 21-28, the plenum 102 may be configured with a number of lifters 110 extending from an inner surface 112 of the plenum's outer wall 114. In this arrangement, aqueous ammonia (or other SNCR reducing agent) is introduced into the plenum 102 at a location near the upper end of thereof (e.g., 11 o'clock), although other locations may be used to fit the needs of a given kiln design. The aqueous ammonia is directed onto an inner surface 116 of the plenum's inner wall 118 where it is heated by thermal energy from the wall 14 of the rotary vessel 12. It should be appreciated that in some configurations the outer surface of the wall 14 of the rotary vessel 12 may define the inner wall of the plenum 102 in which case the aqueous ammonia would be directed directly onto the wall 14. In either case, the combination of the heat from the outer surface of the wall 14 of the rotary vessel 12 and the flow of air being drawn through the plenum 102 by the fan 34 facilitates evaporation of the aqueous ammonia with the evaporation products thereof being drawn into the rotary vessel 12 in the manner described above. The lifters 110 provide constant movement of the aqueous ammonia to enhance its surface area exposure to the heated wall surface and the air flow.

Figure 24:
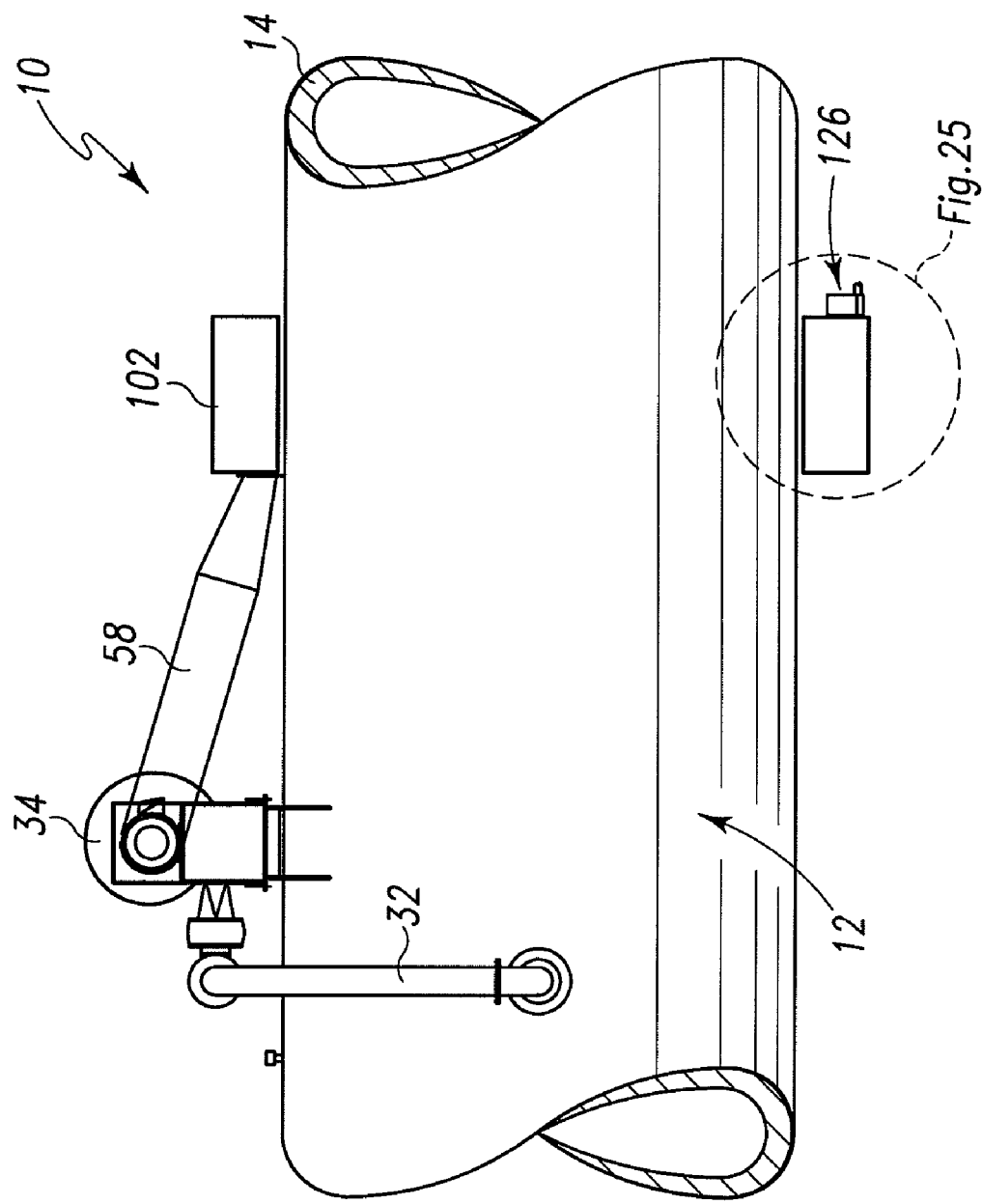
FIGS. 24 and 25 illustrate a mineral processing kiln having a plenum with an aqueous weir to recover reducing agent.
Figure 25:
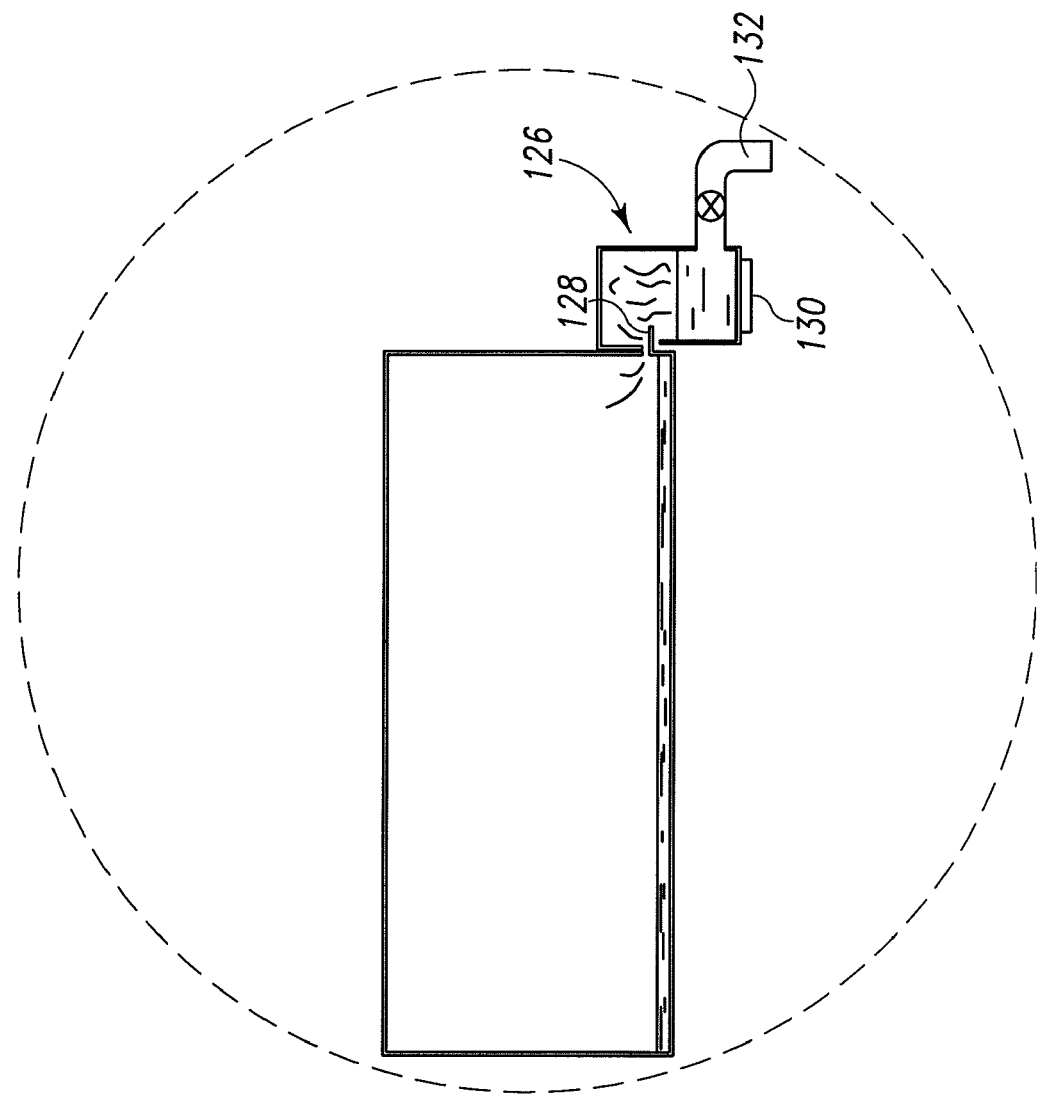
Figure 26:
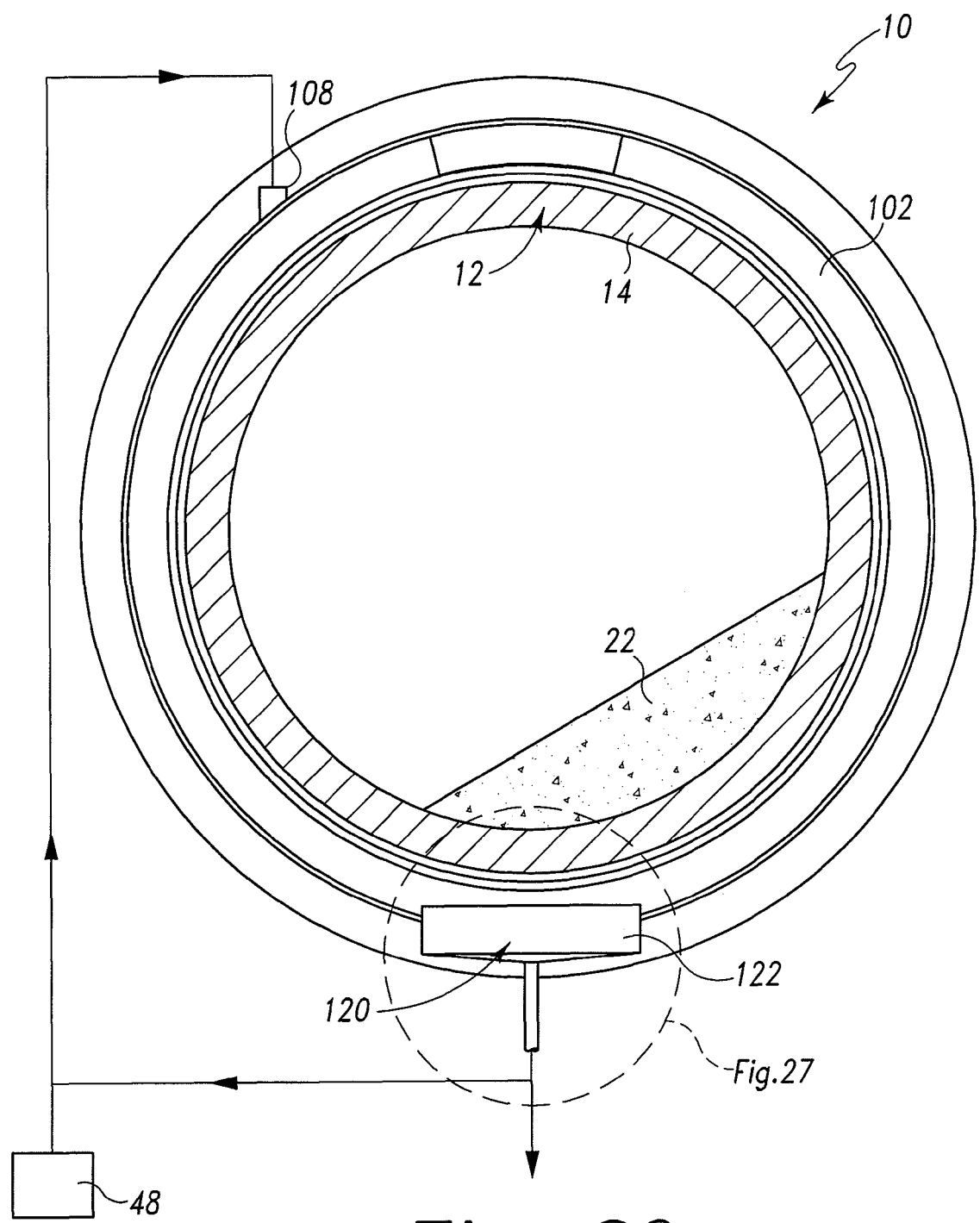
FIGS. 26-28 illustrate various designs for draining the plenum of a mineral processing kiln.
Figure 27:
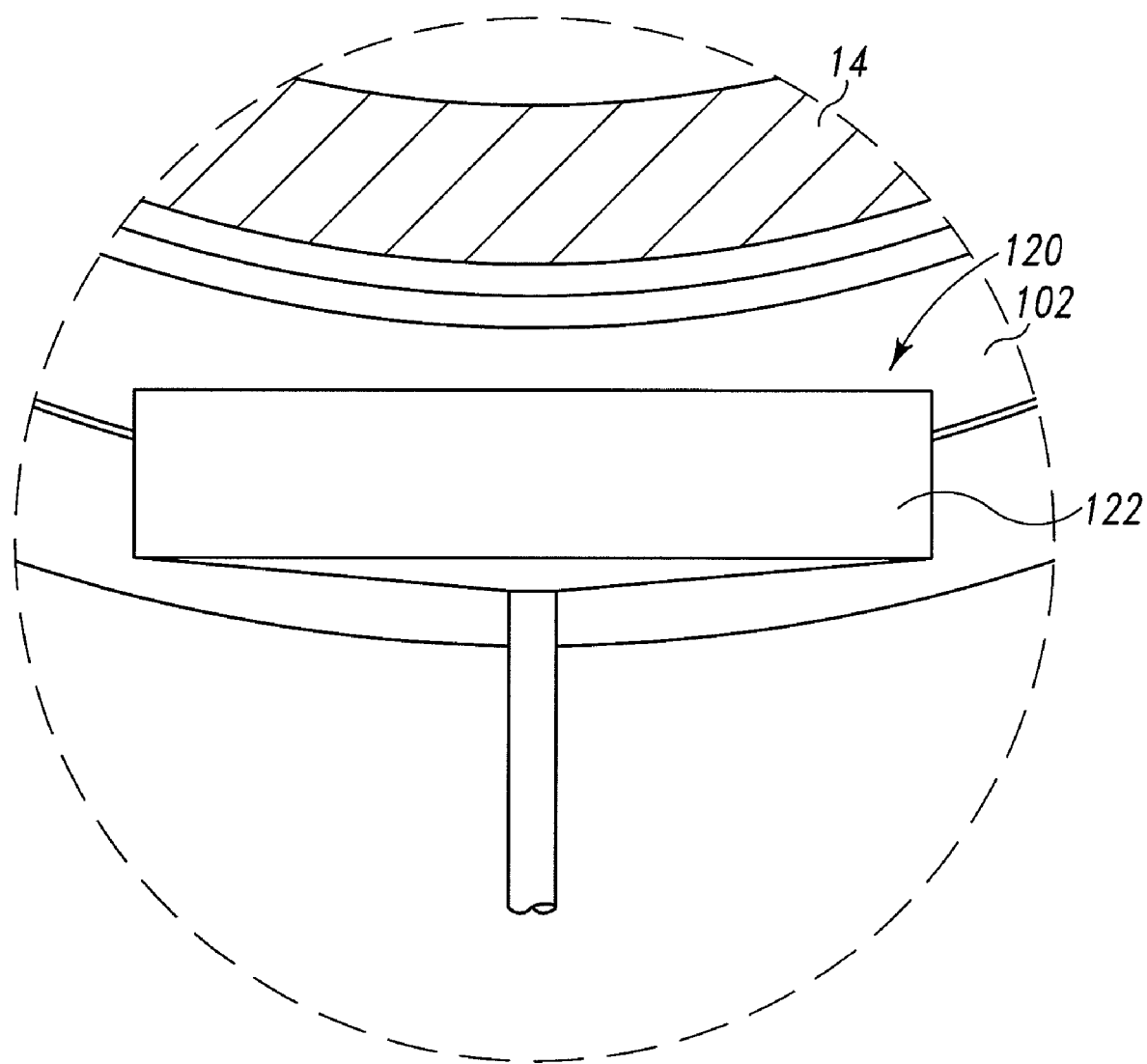
Figure 28:
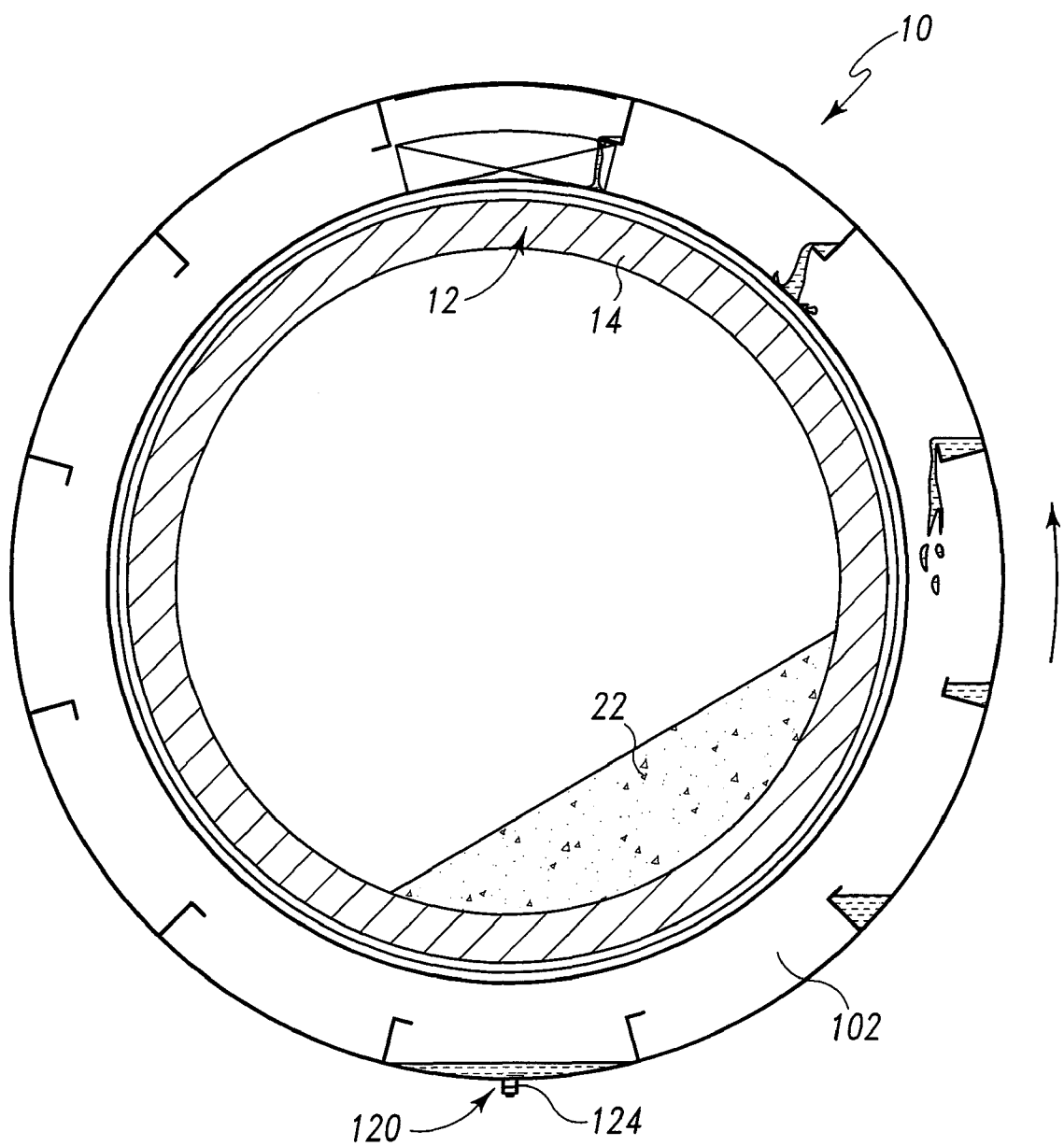

As shown in FIGS. 23-28, a number of different arrangements may be used to manage excess aqueous ammonia, if any, in the plenum 102. In one implementation, a simple drain 120 may be used to drain the plenum 102. As shown in FIGS. 26 and 27, the drain 120 may be stationary so that excess liquid may be drained into the drain's collector 122. Once captured by the collector 122, the drained liquid may then be recirculated into the plenum 102, if desired. Alternatively, as shown in FIG. 28, the drain 120 may be integrated into the plenum 102 and plugged with a drain plug 124. In such a case, the excess liquid may be periodically drained by removing the plug 124. As shown in FIGS. 24 and 25, excess liquid may be advanced into a supplemental heating chamber 126 via, for example, an aqueous weir 128 where it is heated and subsequently evaporated by a heating element 130 (e.g., an electric resistance heating element). The evaporation products from the supplemental heating chamber 126 are drawn back into the plenum 102 and subsequently introduced into the rotary vessel 12. Any excess liquid in the supplemental heating chamber 126 is drained via a drain 132.

Figure 29:
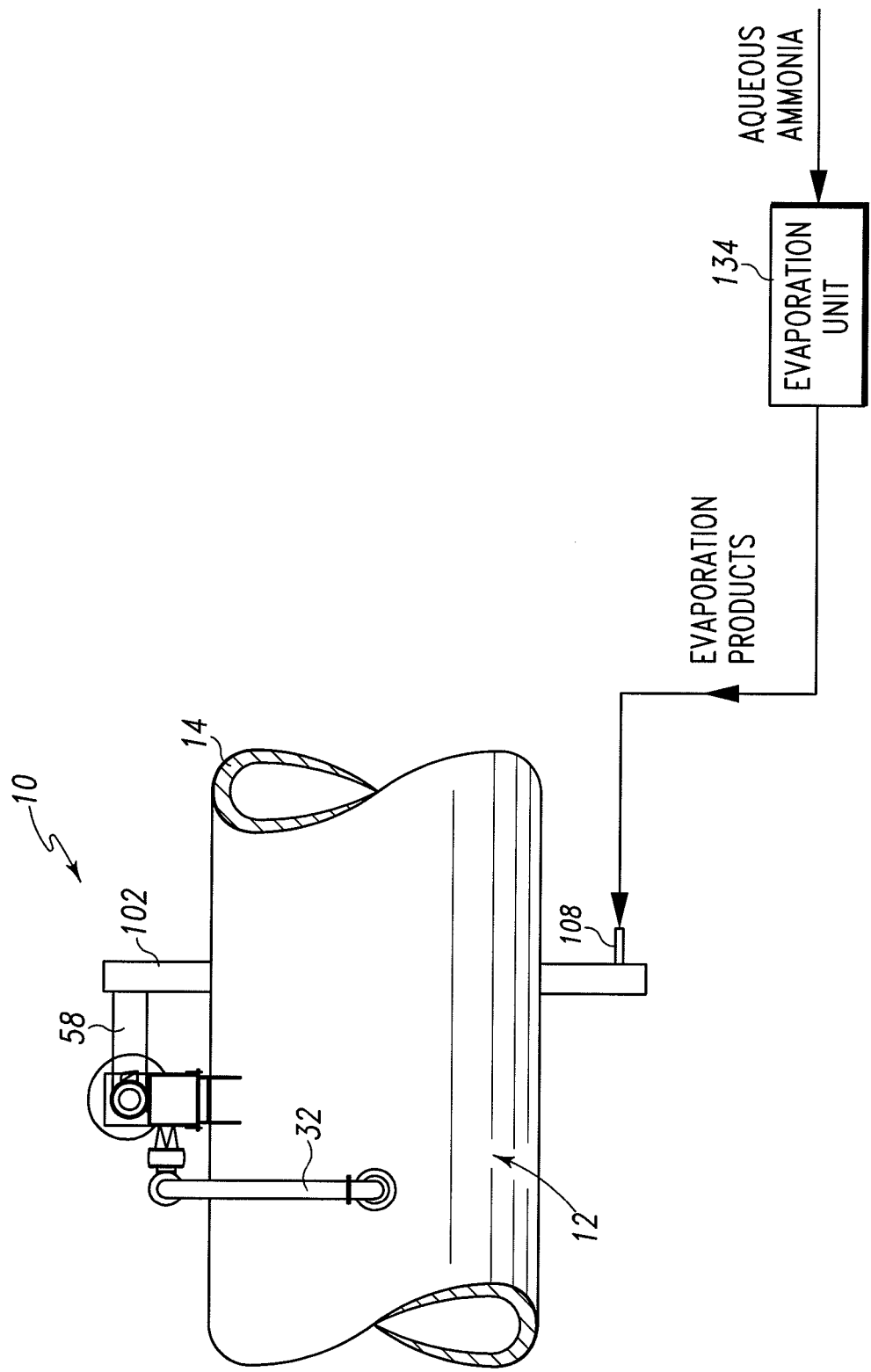
FIG. 29 illustrates a mineral processing kiln with an external evaporation unit.

Another implementation utilizing aqueous ammonia is shown in FIG. 29. In this case, aqueous ammonia is introduced into an evaporation unit 134 that is external to the kiln. The evaporation unit 134 evaporates the aqueous ammonia with the evaporation products therefrom being introduced into the plenum 102 via the injector nozzle 108 and subsequently drawn into the rotary vessel 12 in the manner described above.

It should be appreciated that in addition to gaseous and liquid SNCR reducing agents, dry and/or solid reducing agents may also be introduced through the slot 106 and hence into the rotary vessel via the plenum 102. For example, powderized urea prills, urea powder, or other solids may be introduced into the plenum 102 by way of a solid or powder injection device extending through the slot 106. Moreover, as shown in FIGS. 30 and 31, the plenum 102 may be embodied with a slot 136 defined in its outer annular surface 138. One of a pair of angled flanges 140 is positioned on either side of the slot 136. A feeder, such as a screw feeder 142, feeds urea prills, powderized urea prills, urea powder, or other solid SNCR reducing agent through the slot 106 and into the plenum 102. From there, the urea prills, powderized urea prills, urea powder, or other solid SNCR reducing agent is drawn into the intake of the fans 34 and thereafter exhausted into the rotary vessel 12 through the air injection tube(s) 32. In such a case, the grain size of the powder or the size of the prills may be selected to be efficiently passed through the fans 34.

With reference to FIGS. 32-41, various configurations of stationary portions 150 of a preheater/precalciner kiln are illustrated having points for injection of high-pressure air into the stationary portions 150 to create mixing in the kiln gas streams flowing through those stationary portions 150. Thus, air can be injected at high-pressure, for example, from a fan, blower, or compressor through one or more points located in the walls of the stationary portion 150 of any preheater/precalciner kiln to provide mixing momentum of the gas with consequent reduction of pollutants associated with stratification and localized combustion heterogeneity in such preheater/precalciner equipment.

Figure 32:
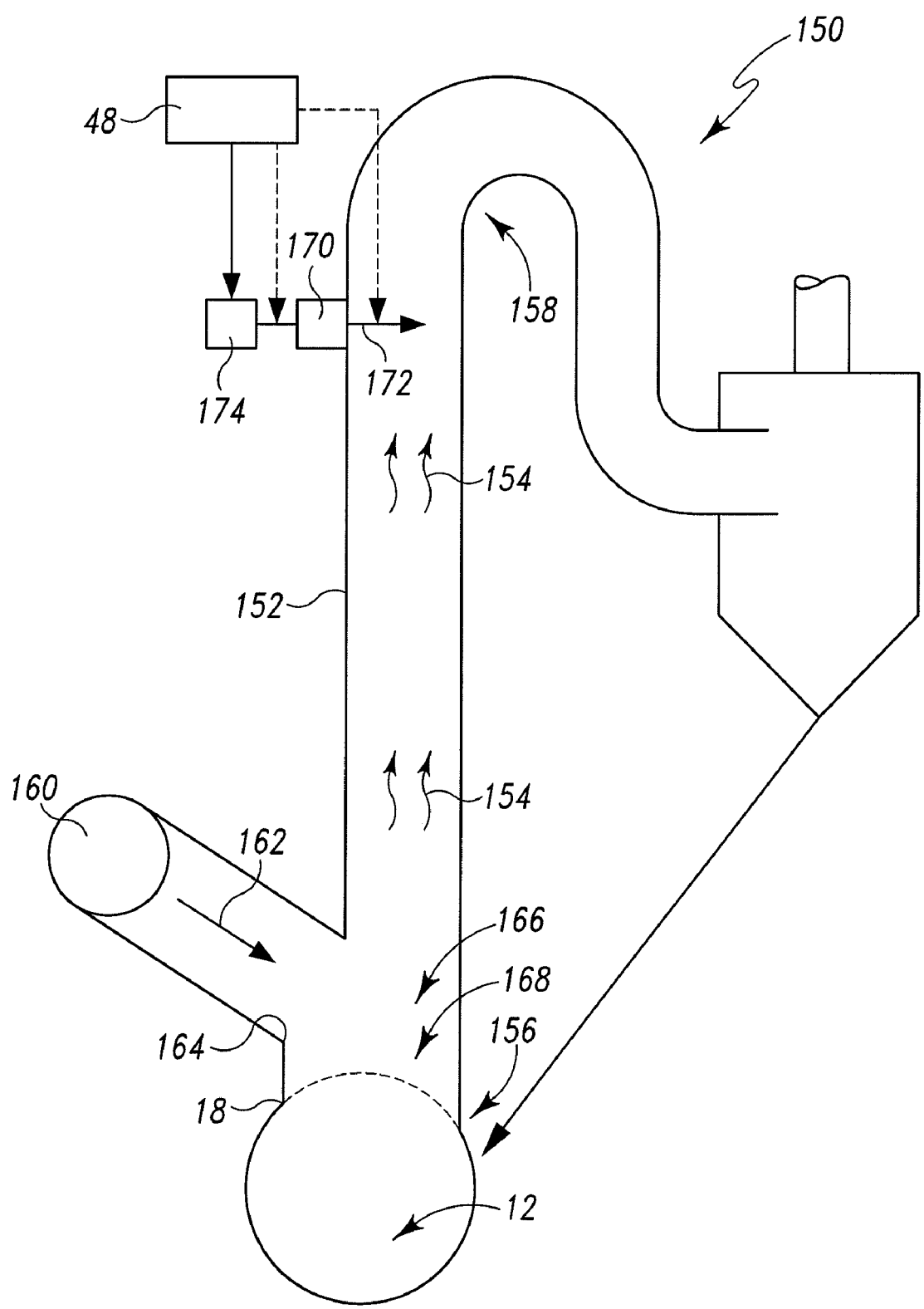
FIGS. 32-41 illustrate diagrammatically various configurations of stationary preheater/precalciner vessels which have been modified to include injectors which introduce high-pressure air to promote the reduction of $NO_X$ emissions by SNCR in the stationary vessels.

Turning to FIG. 32, the stationary portion 150 includes a stationary vessel or riser duct 152 which is positioned proximate the upper end 18 of the rotary vessel 12. As such, the stationary vessel 152 is coupled to the rotary vessel 12 such that kiln gas stream 154 flows out of the rotary vessel 12 and into the stationary vessel 152. The kiln gas stream 154 flows from a lower end 156 to an upper end 158 of the stationary vessel 152.

The stationary portion 150 may include a secondary combustion zone 160 which introduces preheated combustion air such as tertiary air 162 via an inlet 164. The secondary combustion zone 160 includes the flow of heated tertiary air 162 at a temperature range of about 1400° F. to about 2000° F. At this location, the flow of heated tertiary air 162 is introduced into the stationary portion 150 to assist combustion within the stationary portion 150. The stationary portion 150 may also include a fuel inlet 166 and feed assembly 168. The fuel inlet 166 opens into the stationary portion 150 through which fuel, such as coal, can be introduced into the stationary portion 150. The feed assembly 168 opens into the stationary portion 150 through which feed such as mineral 20 can be introduced into the stationary portion 150. For the preheater/precalciner kiln, the stationary portion 150 may also include nozzles to provide oxygen containing gas, typically pre-heated combustion air, adjacent the fuel inlet 166 to promote distribution of the fuel flowing through the fuel inlet 166 and the feed flowing into the stationary portion 150 via the feed assembly 168.

The stationary portion 150 may also include an injector 170 for introducing a stream of high-pressure air 172 into the stationary vessel 152 as shown in FIG. 32. The injector 170 may be embodied as a piece of schedule 80 carbon steel pipe connected to a fan, blower, or compressor (hereinafter, for ease of description, compressor 174) which generates the quantity of high-pressure air 172. Such a piece of pipe may be configured with one or more holes through which the high-pressure air flows into the stationary portion. In an embodiment, the injector 170 is positioned in an upper half of the stationary vessel 152. The quantity of high-pressure air 172 is unheated air such as ambient air. In other words, this high-pressure air 172 is unheated by the kiln process prior to entry into the stationary portion 150. The quantity of high-pressure air 172 emitted from the injectors 170 imparts momentum to the kiln gas streams 154 to dissipate any stratified layers of the kiln gas streams 154 flowing from the lower end 156 to the upper end 158 of the stationary vessel 152. As such, the quantity of high-pressure air 172 imparts momentum to the kiln gas streams 154 which are exiting the rotary vessel 12 and flowing through the stationary portion 150. It should be appreciated that although only a single injector 170 is shown in FIG. 32, any number of injectors may be used.

In an embodiment, the injector 170 may be positioned to introduce the quantity of high-pressure air 172 that imparts momentum in a direction that is perpendicular relative to the flow direction of the kiln gas streams 154. Such momentum may be quantified relative to the mass of gas and solids to be mixed. It should be appreciated that the higher the ratio of induced momentum to mass of gas to be mixed, the faster the mixing will be. For example, a precalciner vessel or duct operating at 2300 metric tons per day capacity would have a mass flow rate of about 78 kg/sec of solid and gas. A single injector 170 injects 1.66 kg/sec of air 172 at a velocity of 248 m/sec, thereby imparting an additional vector of momentum of 412 kg*m/sec. The ratio of additional imparted momentum to mass in the vessel is 5.28 kg*m/sec per kg of calciner flow (i.e., per kg of gas and solids entering the calciner vessel).

According to one exemplary embodiment, the injector 170 may be operated to introduce a quantity of high-pressure air 172 such that the resulting momentum to mass ratio is between 2.0 and 20.0 kg*m/sec per kg of gas and solids entering the calciner vessel. In a more specific exemplary embodiment, the injector 170 may be operated to introduce a quantity of high-pressure air 172 such that the resulting momentum to mass ratio is between 4.0 and 10.0 kg*m/sec per kg of gas and solids entering the calciner vessel.

In an embodiment, the injectors 170 may introduce the quantity of high-pressure air 172 at a pressure of about 6 psi. In another embodiment, the injectors 170 may introduce the quantity of high-pressure air 172 at a pressure of about 6 psi to 12 psi. In yet another embodiment, the injectors 170 may introduce the quantity of high-pressure air 172 at a pressure of about 2 psi to 15 psi. Still further, in an embodiment, the injectors 170 may introduce the quantity of high-pressure air 172 at a pressure of about 2 psi to 100 psi.

In an embodiment, the injectors 170 may introduce the quantity of high-pressure air 172 at a mass flow rate of about 1% to about 5% of the total mass flow rate of the stationary portion 150 (i.e., the total mass flow rate of solids and gas entering the calciner vessel). In another embodiment, the injectors 170 may introduce the quantity of high-pressure air 172 at a mass flow rate of about 2% of the total mass flow rate of the stationary portion 150.

Figure 33:
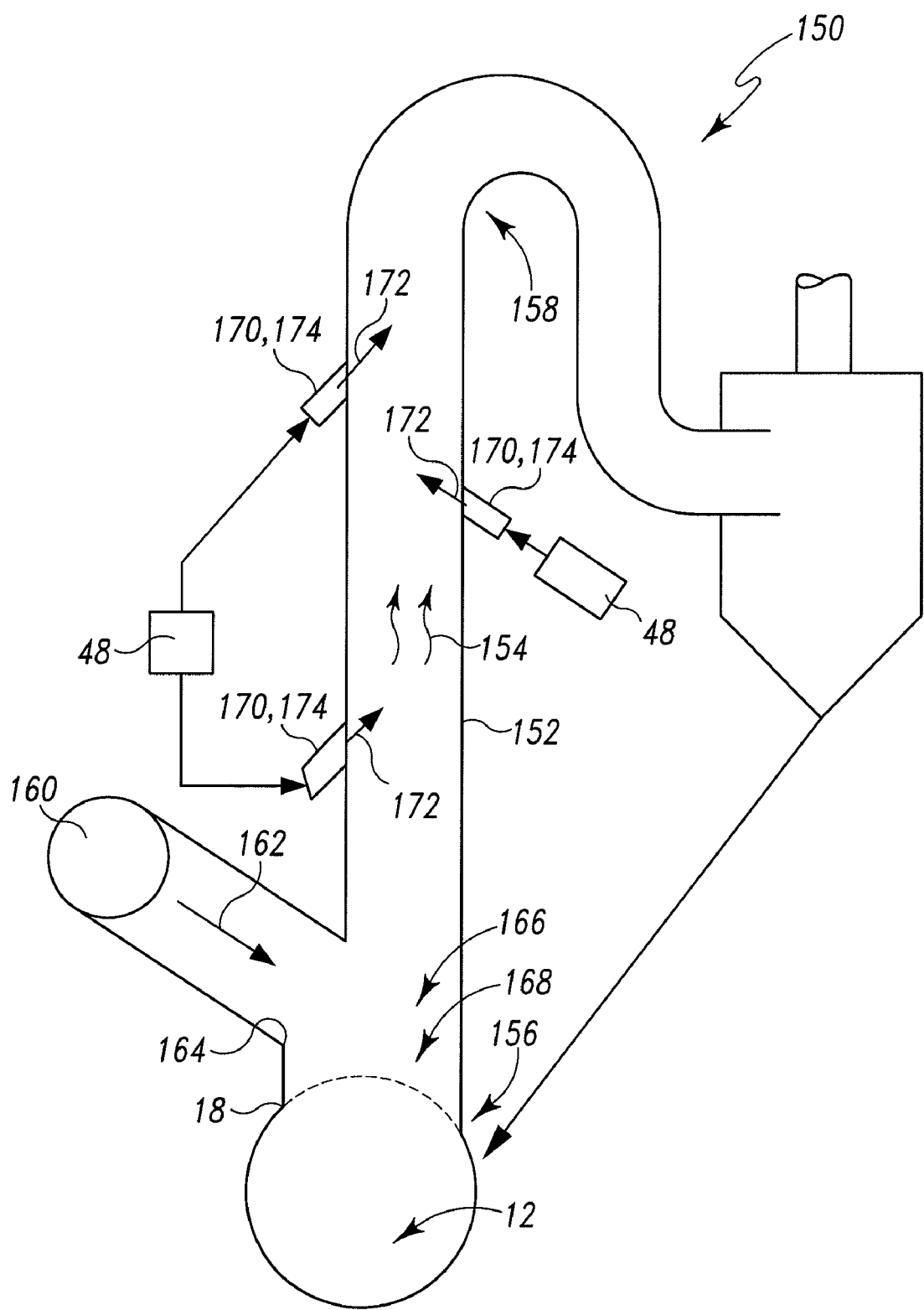

In an embodiment, the injectors 170 may be positioned to introduce the high-pressure air 172 that imparts momentum at a non-perpendicular angle relative to the flow direction of the kiln gas stream 154 as shown in FIG. 33. Moreover, although two injectors 170 are shown in FIG. 33, it should be appreciated that only a single injector 170 may be used. Conversely, more than two injectors may also be used.

Figure 34:
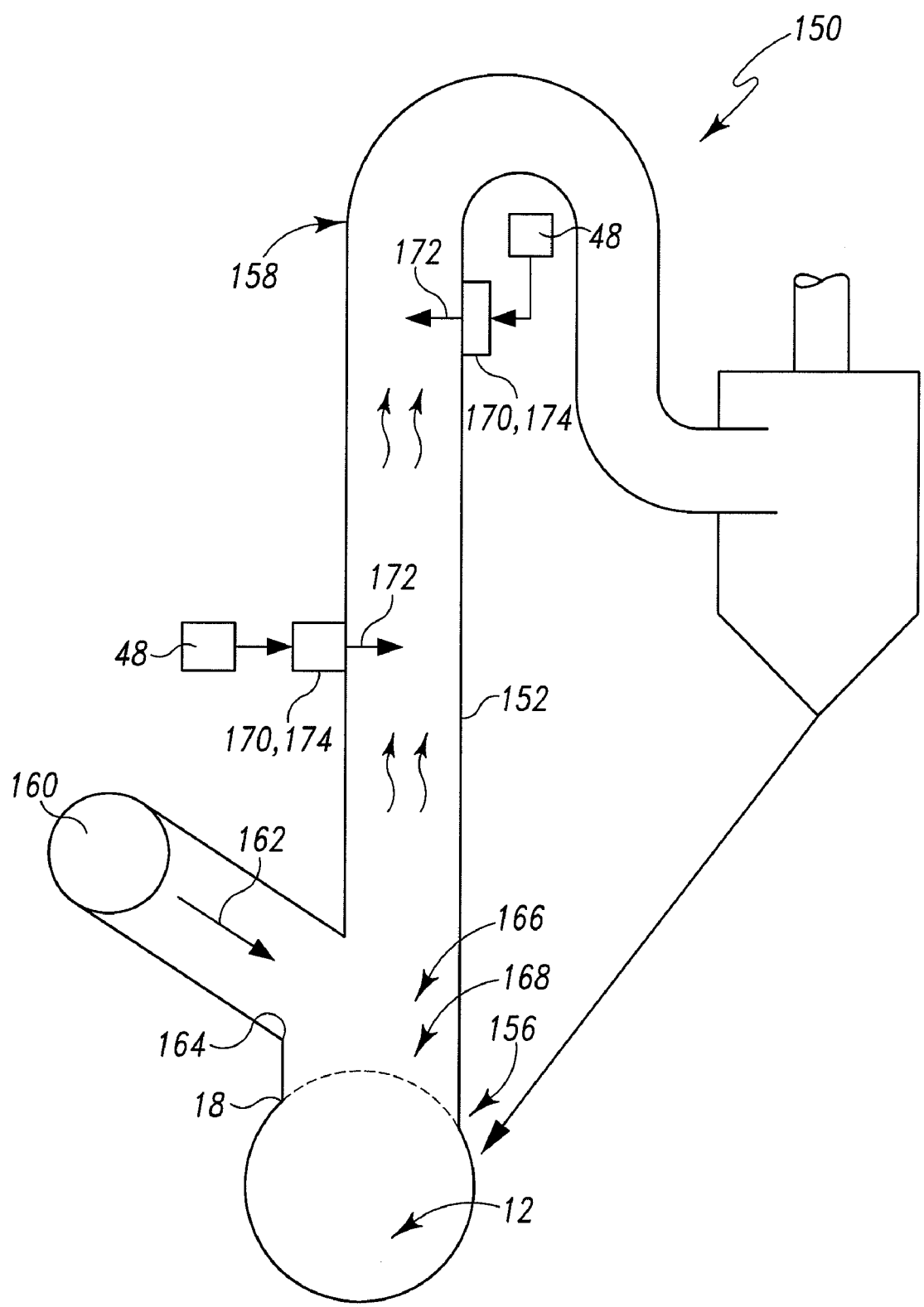

Turning to FIG. 34, the injectors 170 may also be positioned, with respect to the flow direction of the kiln gas stream 154, downstream of the fuel inlet 166 and feed assembly 168. As such, the injectors 170 are positioned above the fuel inlet 166 and the feed assembly 168. The injectors 170 may introduce the high-pressure air 172 at a position downstream of the fuel inlet 166 and feed assembly 168. Although two injectors 170 are shown in FIG. 34, it should be appreciated that only a single injector 170 may be used. Conversely, more than two injectors may also be used.

Figure 35:
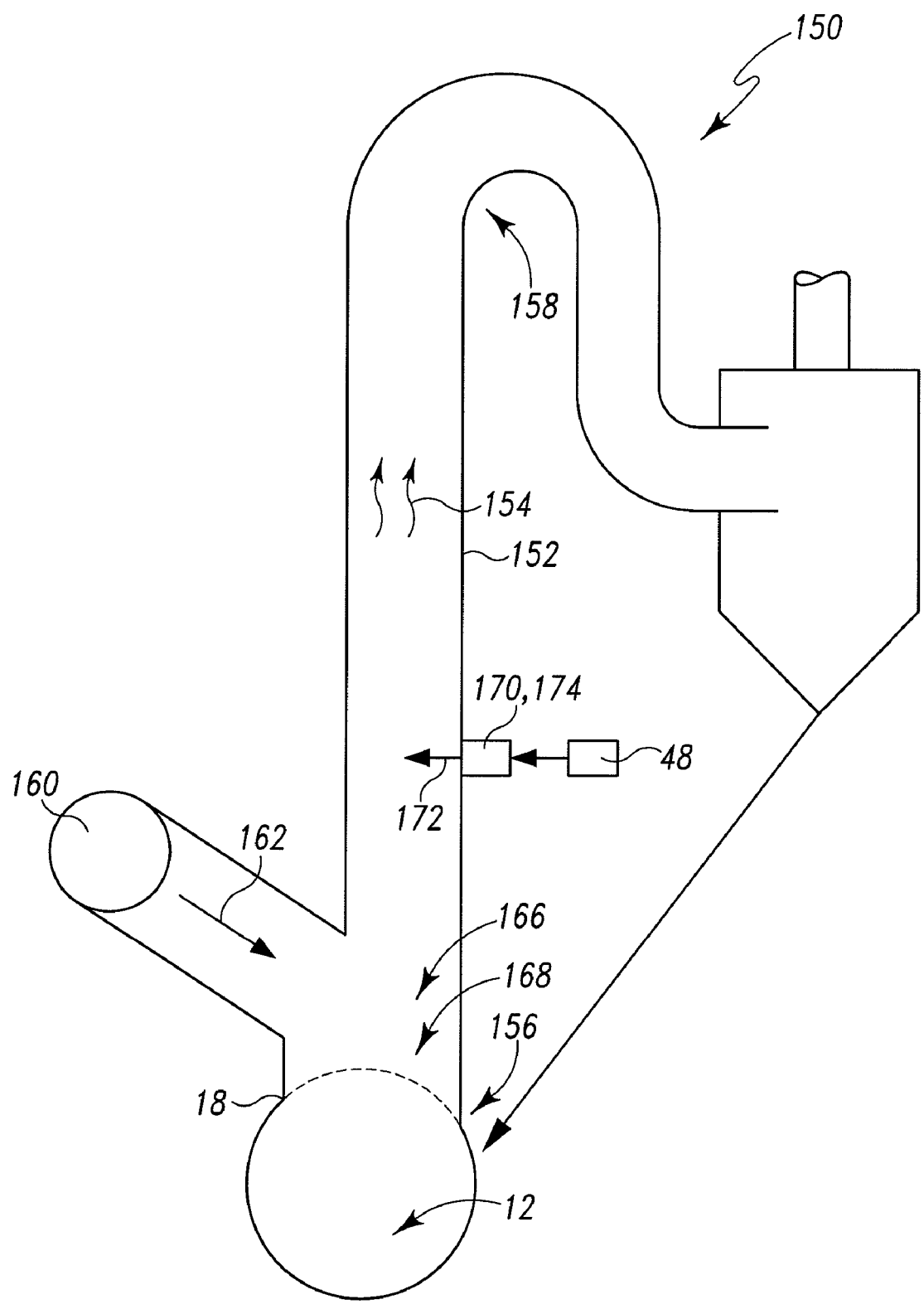
Figure 36:
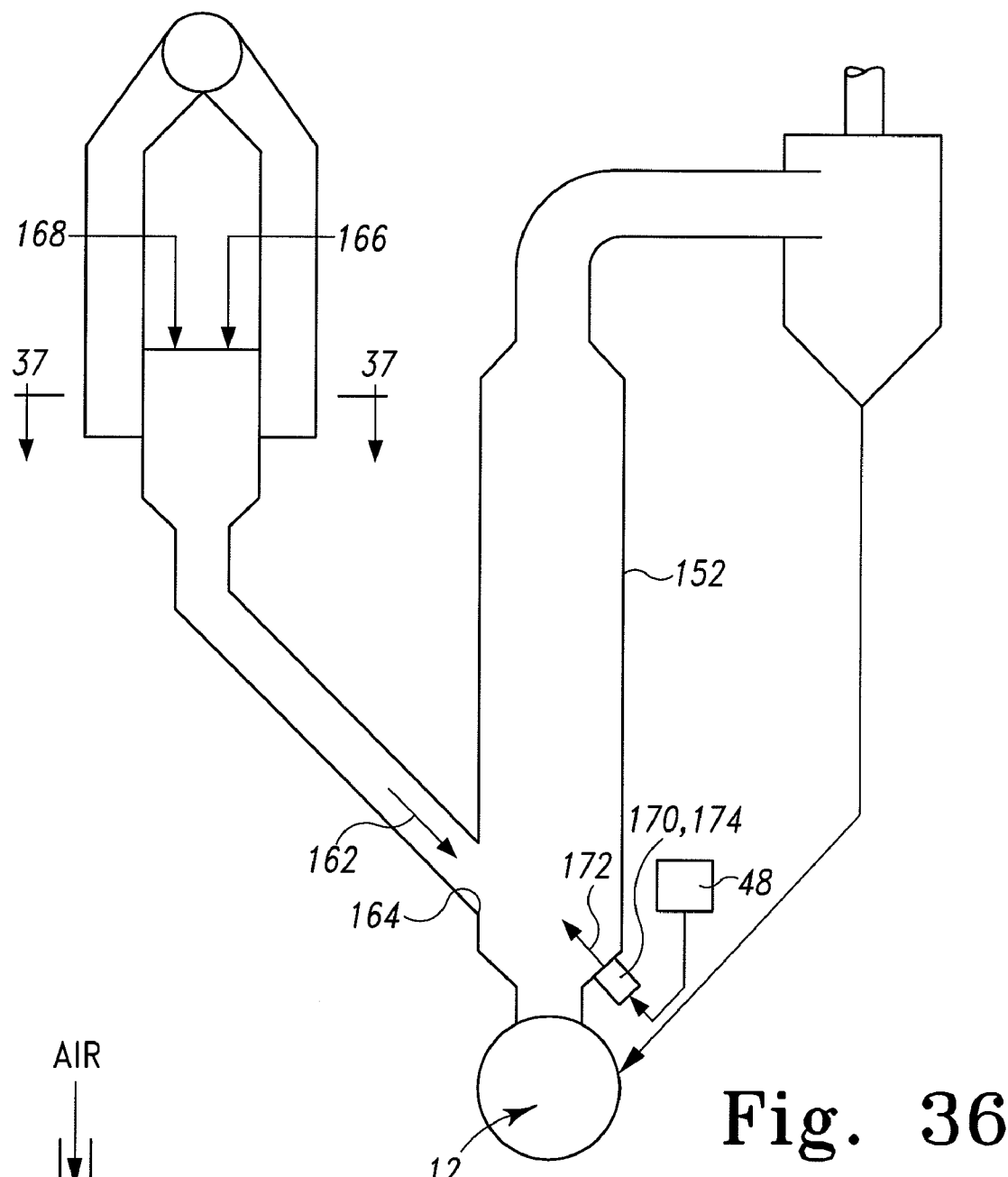
Figure 37:
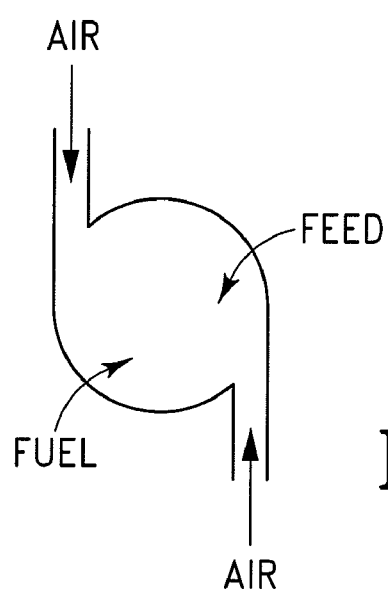

As shown in FIG. 35, with respect to the flow direction of the kiln gas stream 154 through the stationary vessel 152, the injector 170 may be positioned downstream of the inlet 164 of the tertiary air 162 into the stationary vessel 152. As such, the injector 170 is positioned above the inlet 164. In such a way, the injector 170 introduces the high-pressure air 172 at a position downstream of the inlet 164 of the tertiary air 162. As shown in FIGS. 36 and 37, the injector 170 may be positioned opposite the inlet 164 of the tertiary air 162 in order to introduce the high-pressure air 172 to impart momentum to the tertiary air 162. It should be appreciated that although only a single injector 170 is shown in the embodiments of FIGS. 35-37, any number of injectors may be used.

Figure 38:
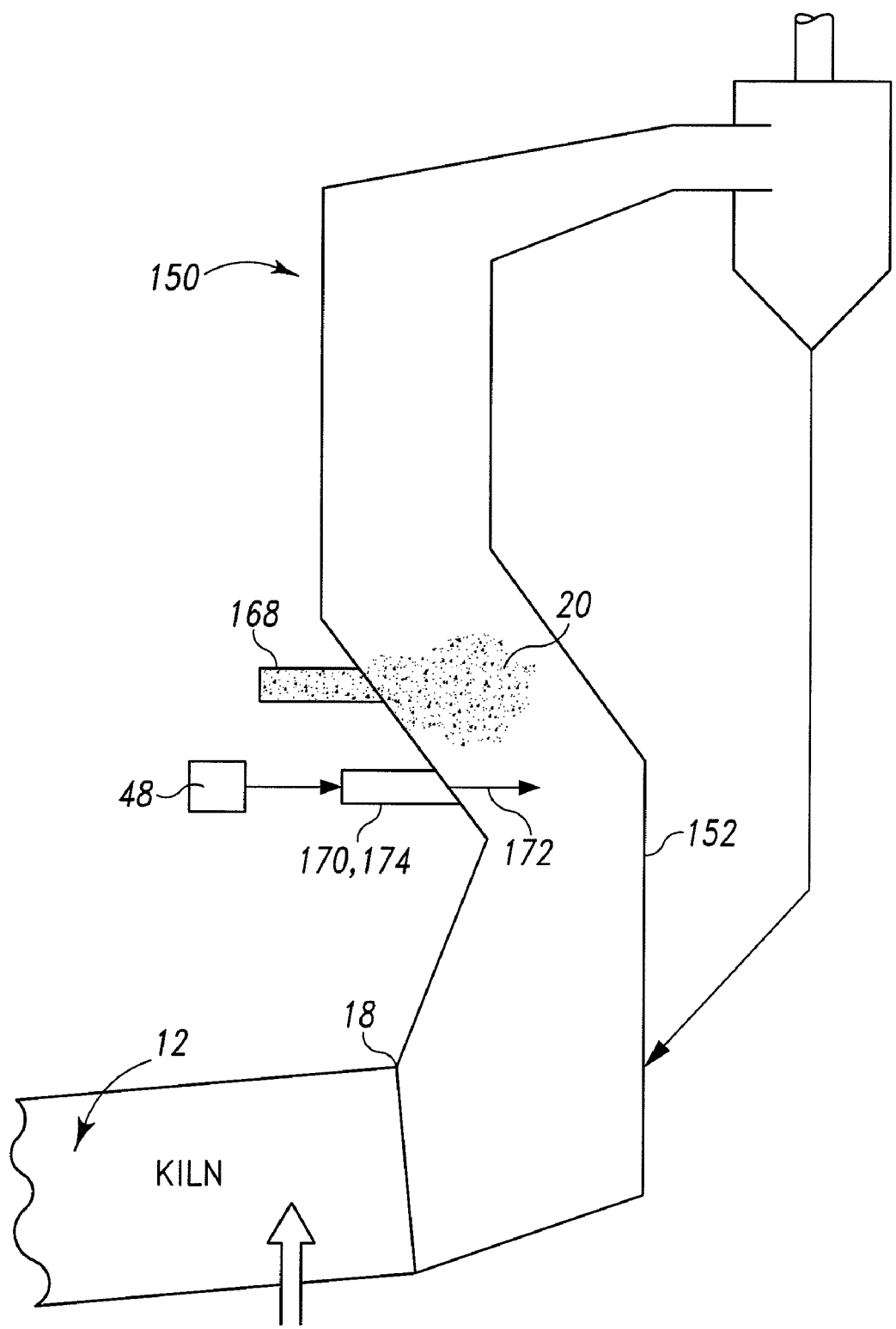

Turning to FIG. 38, the feed assembly 168 is coupled to the stationary portion 150 to advance feed 20 such as mineral from the stationary portion 150 through the stationary vessel 152 and into the upper end 18 of the rotary vessel 12. With respect to the flow direction of the feed 20 through the stationary vessel 152, the injector 170 may be positioned downstream from the feed assembly 168. In this embodiment, the injector 170 introduces the quantity of high-pressure air 172 to impart momentum to the feed 20 to facilitate mixing of the feed 20 with the kiln gas stream as the feed 20 exits the feed assembly 168. Accordingly, the injector 170 introduces the quantity of high-pressure air 172 downstream of the feed 20 as the feed 20 advances from the stationary portion 150 to the upper end 18 of the rotary vessel 12. It should be appreciated that although only a single injector 170 is shown in FIG. 38, any number of injectors may be used.

Figure 39:
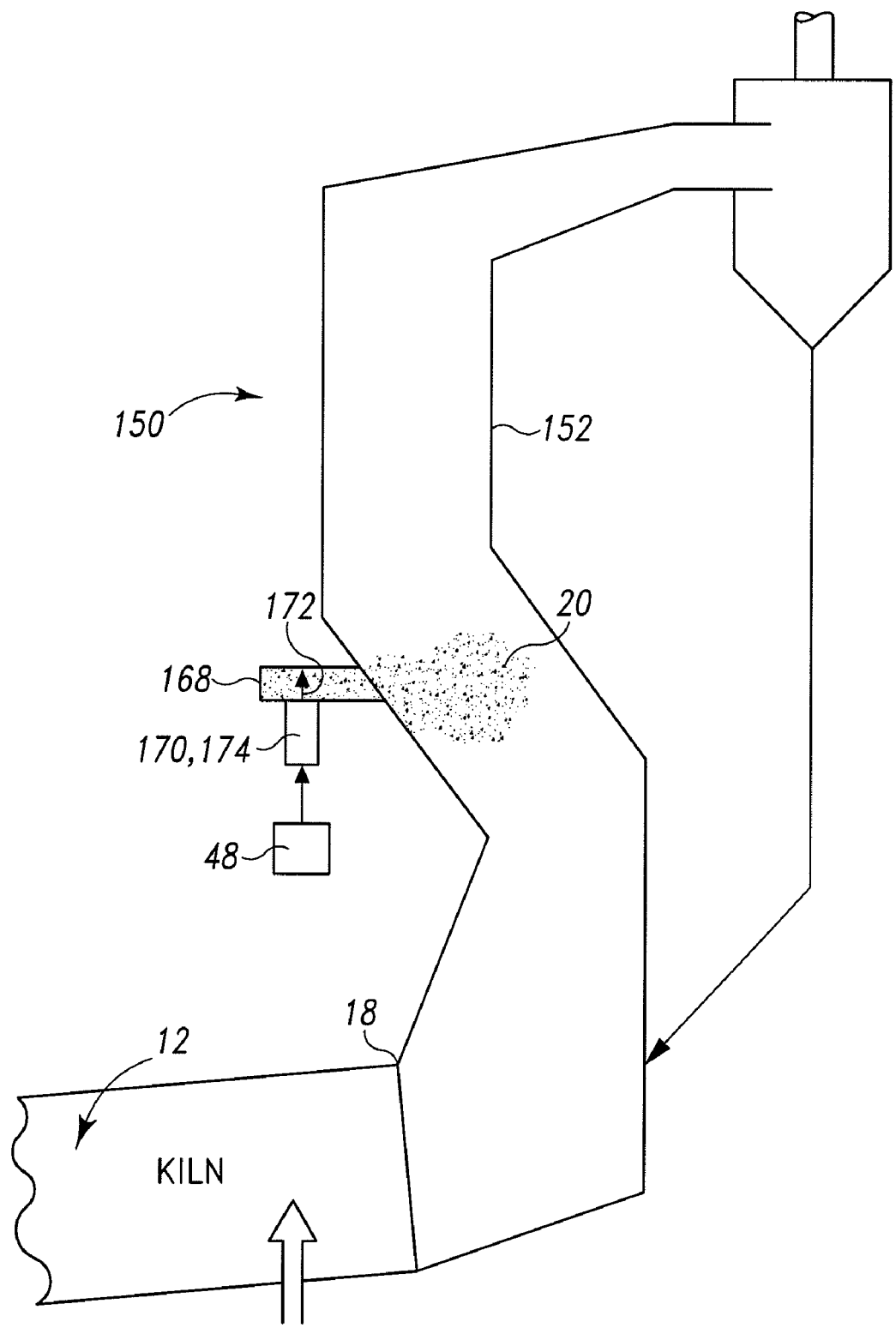

As shown in FIG. 39, the injector 170 may be positioned within the feed assembly 168 in order to impart momentum via the high-pressure air 172 to the feed 20 as the feed 20 travels through the feed assembly 168 and into the stationary vessel 152. It should be appreciated that although only a single injector 170 is shown in FIG. 39, any number of injectors may be used.

Figure 40:
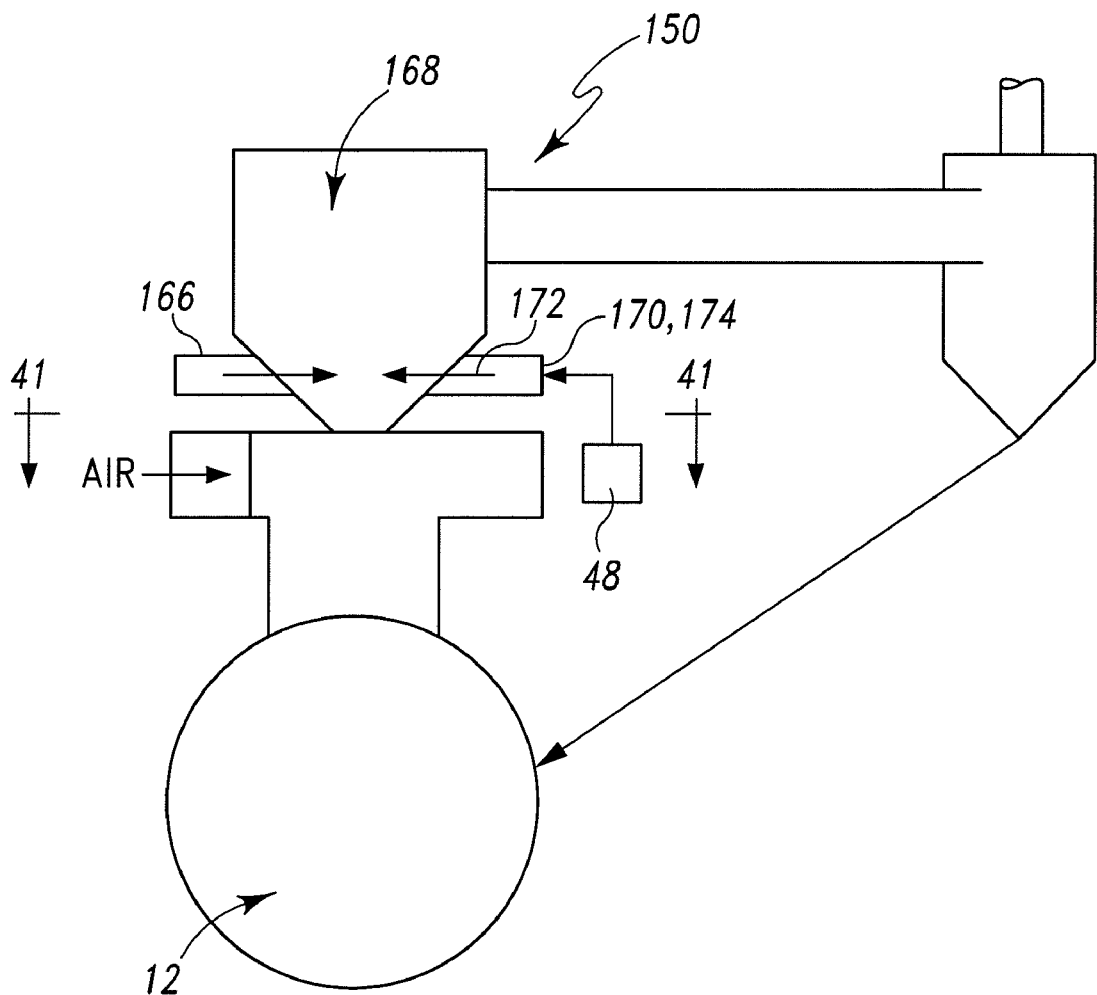
Figure 41:
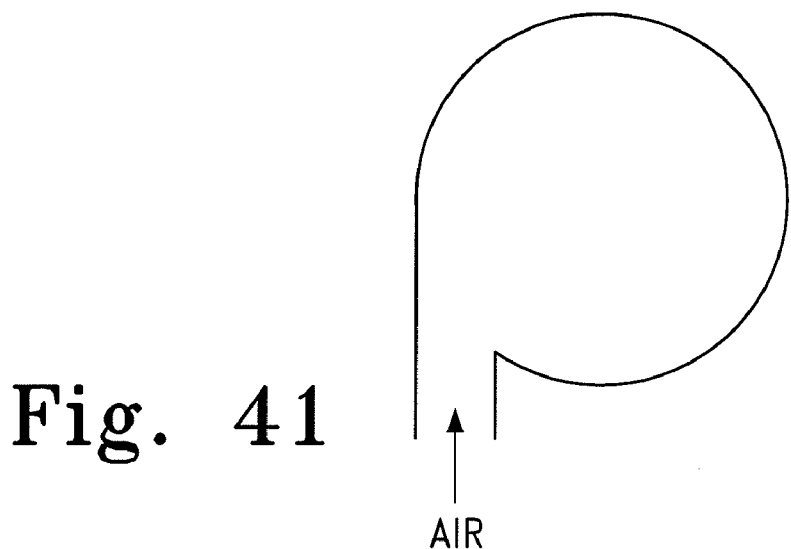

Turning to FIGS. 40 and 41, the injector 170 may be positioned opposite the fuel inlet 166. In this embodiment, the injector 170 introduces high-pressure air 172 to impart momentum to the fuel to facilitate mixing of the fuel as it exits the fuel inlet 166. Although only a single injector 170 is shown in FIG. 40, any number of injectors may be used.

Regardless of the configuration of the stationary portion 150 and the placement of the injectors 170, the injectors 170 introduce the quantity of high-pressure air 172 into the stationary vessel 152 to facilitate cross sectional mixing of the kiln gas streams 154 and/or the feed 20. As such, the injectors 170 introduce the quantity of high-pressure air 172 to promote mixing flow such as turbulent, rotational or cyclonic flow in the stationary vessel 152.

SNCR may also be implemented in the stationary portions 150 of preheater/precalciner kilns such as in the locations illustrated in FIGS. 32-41, amongst other locations. One way to do so is to introduce anhydrous ammonia into the injected high-pressure air flow to both mix the kiln gases flowing through those stationary portions 150 and reduce $NO_X$ emissions by SNCR. Thus, air can be injected at high-pressure, for example, from the compressor 174, and anhydrous ammonia through one or more points located in the walls of the stationary portion 150 of any preheater/precalciner kiln to provide mixing momentum of the gas with consequent reduction of pollutants associated with stratification and localized combustion heterogeneity in such preheater/precalciner equipment and SNCR. The anhydrous ammonia may be advanced through the compressor 174 along with the air, or may be introduced downstream of the compressor.

As described above in regard to FIGS. 32-41, mixing within a stationary duct of a preheater/precalciner kiln may be accomplished by the use of high-pressure air. SNCR with anhydrous ammonia may be accomplished by putting some ammonia gas in the high-pressure air stream. To do so, ammonia gas may be introduced into a kiln process (e.g., preheater/precalciner kilns) in a high momentum air stream in order to mix the ammonia throughout the gas stream to be treated. In exemplary embodiments, air is introduced in a quantity that is greater than 1% of the mass flow in the duct and at a momentum sufficient to mix the ammonia into the cross section of the duct. Such an arrangement is in stark contrast to conventional techniques of introducing aqueous ammonia into preheater/precalciner kilns in which only incidental air is introduced with the aqueous spray. Moreover, the cost of SNCR can be significantly reduced through the use of anhydrous ammonia. For example, a typical 1,000,000 tons-per-year precalciner kiln can use as much as three tons per day of ammonia delivered in an aqueous solution at a cost of approximately $700/ton, or about $700,000 per year. Anhydrous ammonia is far less expensive, currently about $400/ton. As such, by use of anhydrous ammonia, the same three tons-per-day kiln using anhydrous ammonia at $400/ton would cost about $400,000 per year for ammonia thereby producing a $300,000 per year savings.

The pressurized air and anhydrous ammonia may be introduced into the kiln at a velocity of about 30% of the speed of sound up to the speed of sound. This sonic or near sonic velocity jet has sufficient momentum to distribute the ammonia throughout the duct and mix the entire cross section in the duct. In such a way, the ammonia is mixed into the gas in the duct and the commonly stratified gas in the duct is mixed (i.e., de-stratified). In other words, the combination of both the mixing of ammonia into the kiln gases and the mixing of the kiln gases themselves is achieved in the duct.

The anhydrous ammonia may be mixed into the compressed air before or after the compressor or fan. In other words, the ammonia gas may be introduced into the inlet of the compressor or fan (e.g., the compressor 174 of FIGS. 32-41). Alternatively, as shown in phantom in FIG. 32, the anhydrous ammonia may be introduced into the high-pressure air stream at a location downstream of the compressor or fan such as at a location between the compressor 174 and the nozzles 170 of FIGS. 32-41. As also shown in phantom in FIG. 32, the SNCR reducing agent may also be introduced into the high-pressure air stream within the vessel 152 at a location where it is directed into the high-pressure air 172. In such a way, the SNCR reducing agent is introduced into the vessel 152 at an upstream location (relative to the direction of flow of the kiln gases) where it is carried downstream by the kiln gases and into contact with the high-pressure air stream 172 from the nozzles 170 where it is mixed, along with the kiln gases, throughout the cross section of the vessel 152. It should be appreciated that similar results may be achieved by introducing the SNCR reducing agent at the same point within the vessel 152 as the injector 170, or even at a point slightly downstream of the injector 170, provided the high-pressure air 172 created by the injector 170 acts upon the SNCR reducing agent to mix it throughout the cross section of the stationary vessel 152. In one exemplary arrangement, the anhydrous ammonia is introduced at a location downstream of the compressor since the ammonia gas is already pressurized. If implemented in the construction of a long kiln, the ammonia gas may be mixed in a manifold at the fan inlet.

In addition to anhydrous ammonia, other SNCR reducing gases may also be used. For example, the pyrolysis products of urea may be mixed into a high-pressure air stream and subsequently introduced into the kiln.

In an exemplary implementation, a 1600 ton-per-day (66 ton-per-hour) preheater kiln has about 150 tons-per-hour of combustion gasses to treat. The typical amount of ammonia used is 1.0 pound to 2.0 pounds per clinker ton. For this kiln, at 1.5 pounds of ammonia per clinker ton, one needs to mix 100 pounds-per-hour of ammonia into 300,000 pounds per hour (150 tons-per-hour) of combustion products. This mixing must be done fast since the kiln gas is in the required temperature zone for only about one second. Rapidly mixing such a large mass of gas takes a significant amount of energy. The ammonia can be mixed into the large quantity of gas by first mixing the anhydrous ammonia into a high-pressure gas stream (2 psi to 100 psi, or 15 psi for this example). For this example, the 100 pounds-per-hour of ammonia (about 40 cfm) is mixed into a compressed air stream with a flow rate of about 2.25 tons-per-hour (1000 cfm). This compressed air stream at 15 psi, now containing about 4% ammonia gas by volume, is then injected into the stationary duct of the kiln at a velocity of about 50% of the speed of sound to the speed of sound. This sonic or near sonic velocity jet has sufficient momentum to distribute the ammonia gas throughout the duct and mix the entire cross section in the duct.

While the disclosure is susceptible to various modifications and alternative forms, specific exemplary embodiments thereof have been shown by way of example in the drawings and has herein be described in detail. It should be understood, however, that there is no intent to limit the disclosure to the particular forms disclosed, but on the contrary, the intention is to cover all modifications, equivalents, and alternatives falling within the spirit and scope of the invention as defined by the appended claims.

There are a plurality of advantages of the present disclosure arising from the various features of the apparatus and methods described herein. It will be noted that alternative embodiments of the apparatus and methods of the present disclosure may not include all of the features described yet still benefit from at least some of the advantages of such features. Those of ordinary skill in the art may readily devise their own implementations of an apparatus and method that incorporate one or more of the features of the present disclosure and fall within the spirit and scope of the present disclosure.

The invention claimed is:

1. A method of operating a mineral processing kiln having an inclined rotary vessel, comprising:
   rotating the rotary vessel to advance mineral from an upper end of the inclined rotary vessel to a lower end of the inclined rotary vessel,
   introducing a stream of high-pressure air through an opening in a wall of the rotary vessel at a location between the upper end of the rotary vessel and the lower end of the rotary vessel,
   advancing, during rotation of the rotary vessel, a liquid SNCR reducing agent from a source that is remote from the rotary vessel, and
   introducing the liquid SNCR reducing agent into the stream of high-pressure air,
   wherein the mineral processing kiln further has (i) an air nozzle extending into the rotary vessel through the opening in the all of the vessel, (ii) an air pressurizer having an output coupled to the air nozzle, and (iii) a plenum coupled to an intake of the air pressurizer, the step of introducing the stream of high-pressure air includes drawing air from the plenum and introducing high-pressure air through the nozzle with the air pressurizer, and the step of introducing the liquid SNCR reducing agent includes (i) introducing the liquid SNCR reducing agent into the plenum, (ii) pyrolyzing the liquid SNCR reducing agent to a gaseous state in the plenum, and (iii) drawing the gaseous SNCR reducing agent from the plenum and introducing the gaseous SNCR reducing agent through the nozzle with the air pressurizer.

2. The method of claim 1, wherein the step of introducing the stream of high-pressure air includes introducing a mass flow rate of about 1% to about 15% of the rate of mass consumption of combustion air by the mineral processing kiln.

3. The method of claim 1, wherein:

the mineral processing kiln further has an air nozzle extending into the rotary vessel through the opening in the wall of vessel, and the step of introducing the stream of high-pressure air includes introducing high-pressure air through the air nozzle.

4. The method of claim 3, wherein:

the air nozzle has an air pressurizer coupled thereto, and the step of introducing the stream of high-pressure air includes introducing high-pressure air from the air pressurizer through the air nozzle.

5. The method of claim 1, wherein the rotating step includes rotating the rotary vessel relative the plenum.

6. The method of claim 1, wherein the rotating step includes rotating the rotary vessel and the plenum.

7. A method of operating a mineral processing kiln having an inclined rotary vessel, comprising:

rotating the rotary vessel to advance mineral from an upper end of the inclined rotary vessel to a lower end of the inclined rotary vessel, introducing a stream of high-pressure air through an opening in a wall of the rotary vessel at a location between the upper end of the rotary vessel and the lower end of the rotary vessel, and introducing a gaseous SNCR reducing agent into the stream of high-pressure air, wherein the step of introducing the gaseous SNCR reducing agent further includes: pyrolyzing an SNCR reducing agent to a gaseous state in a plenum, and drawing the gaseous SNCR reducing agent from the plenum and introducing the gaseous SNCR reducing agent into the stream of high-pressure air.

8. The method of claim 7, wherein the step of introducing the stream of high-pressure air includes introducing a mass flow rate of about 1% to about 15% of the rate of mass consumption of combustion air by the mineral processing kiln.

9. The method of claim 7, wherein:

the mineral processing kiln further has an air nozzle extending into the rotary vessel through the opening in the wall of vessel, and the step of introducing the stream of high-pressure air includes introducing high-pressure air through the air nozzle.

10. The method of claim 9, wherein:

the air nozzle has an air pressurizer coupled thereto, and the step of introducing the stream of high-pressure air includes introducing high-pressure air from the air pressurizer through the air nozzle.

11. The method of claim 7, wherein:

the mineral processing kiln further has (i) an air nozzle extending into the rotary vessel through the opening in the wall of vessel, and (ii) an air pressurizer having (a) an intake, and (b) an output coupled to the air nozzle, the step of introducing the stream of high-pressure air includes drawing air from the intake of the air pressurizer and introducing high-pressure air through the air nozzle with the air pressurizer, and the step of introducing the gaseous SNCR reducing agent into the stream of high-pressure air includes introducing the gaseous SNCR reducing agent into the high-pressure air stream at a location between the output of the air pressurizer and the air nozzle.

12. The method of claim 7, wherein:

the mineral processing kiln further has (i) an air nozzle extending into the rotary vessel through the opening in the wall of vessel, and (ii) an air pressurizer having (a) an intake, and (b) an output fluidly coupled to the air nozzle, the step of introducing the stream of high-pressure air includes drawing air from the intake of the air pressurizer and introducing high-pressure air through the air nozzle with the air pressurizer, and the step of introducing the gaseous SNCR reducing agent into the stream of high-pressure air includes introducing the gaseous SNCR reducing agent at a location upstream of the intake of the air pressurizer such that the gaseous SNCR reducing agent is drawn into the intake of the air pressurizer.

* * * * *